(12) United States Patent
Asendorf et al.

(10) Patent No.: US 10,997,543 B2
(45) Date of Patent: May 4, 2021

(54) PERSONAL PROTECTIVE EQUIPMENT AND SAFETY MANAGEMENT SYSTEM FOR COMPARATIVE SAFETY EVENT ASSESSMENT

(71) Applicant: 3M INNOVATIVE PROPERTIES COMPANY, St. Paul, MN (US)

(72) Inventors: Nicholas A. Asendorf, St. Paul, MN (US); Saber Taghvaeeyan, Maple Grove, MN (US); Ronald D. Jesme, Plymouth, MN (US); Justin M. Johnson, Hudson, WI (US); Robert W. Shannon, Stillwater, MN (US); Robert D. Lorentz, North Oaks, MN (US); Andrew H. Tilstra, Shoreview, MN (US); Eric C. Lobner, Woodbury, MN (US); Steven T. Awiszus, Woodbury, MN (US); Glenn E. Casner, Woodbury, MN (US); Kiran S. Kanukurthy, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/400,738

(22) Filed: May 1, 2019

(65) Prior Publication Data
US 2019/0347597 A1 Nov. 14, 2019

Related U.S. Application Data

(60) Provisional application No. 62/668,721, filed on May 8, 2018.

(51) Int. Cl.
*G06Q 10/06* (2012.01)
*G06F 1/16* (2006.01)
(Continued)

(52) U.S. Cl.
CPC ....... *G06Q 10/06395* (2013.01); *G06F 1/163* (2013.01); *G06Q 10/06398* (2013.01);
(Continued)

(58) Field of Classification Search
CPC ....... H04L 67/12; G08B 25/016; G08B 21/02; G08B 21/0446; H04W 12/00508; G06Q 10/0635; G06Q 10/0639; G06N 20/00
(Continued)

(56) References Cited

U.S. PATENT DOCUMENTS

2003/0167187 A1    9/2003  Bua
2004/0004547 A1*   1/2004  Appelt ............ G08B 21/182
                                           340/573.1
(Continued)

FOREIGN PATENT DOCUMENTS

EP       3 276 554       1/2018
WO    WO 2017-180475    10/2017

OTHER PUBLICATIONS

Ben-Hur, Asa et al. Support Vector Clustering. Journal of Machine Learning Research. 2001 p. 125-137.*
(Continued)

*Primary Examiner* — Johnna R Loftis
(74) *Attorney, Agent, or Firm* — Steven A. Bern; Christopher D. Karlen

(57) ABSTRACT

In one example, a system includes one or more personal protective equipment (PPE) devices each configured to be worn by a worker, the PPE devices each including one or more sensors that generate activity data indicative of activities of workers operating within one or more work environments. The system also includes a computing device, the computing device configured to: identify, based at least on the activity data, a plurality of clusters of one or more entities, wherein each entity of the entities is associated with
(Continued)

one or more of the workers; and output an indication of a difference between performance by a target entity with respect to safety events and performance by the cluster that includes the target entity with respect to safety events.

30 Claims, 6 Drawing Sheets

(51) Int. Cl.
G06Q 30/00 (2012.01)
G06Q 50/26 (2012.01)
H04B 1/3827 (2015.01)

(52) U.S. Cl.
CPC ... *G06Q 10/063114* (2013.01); *G06Q 30/018* (2013.01); *G06Q 50/265* (2013.01); *H04B 1/385* (2013.01)

(58) Field of Classification Search
USPC ............................... 340/870; 705/7.42, 7.38
See application file for complete search history.

(56) References Cited

U.S. PATENT DOCUMENTS

| 2005/0091102 | A1 | | 4/2005 | Retsina | |
|---|---|---|---|---|---|
| 2006/0253491 | A1 | * | 11/2006 | Gokturk | G06F 16/5838 |
| 2008/0048931 | A1 | * | 2/2008 | Ben-Ari | G01C 21/165 |
| | | | | | 345/8 |
| 2008/0215314 | A1 | * | 9/2008 | Spangler | G06F 16/355 |
| | | | | | 704/10 |
| 2008/0302360 | A1 | * | 12/2008 | Chambers | A62B 7/10 |
| | | | | | 128/202.13 |
| 2013/0139816 | A1 | * | 6/2013 | Proctor | A62B 18/02 |
| | | | | | 128/204.15 |
| 2013/0274587 | A1 | * | 10/2013 | Coza | A61B 5/6804 |
| | | | | | 600/409 |
| 2016/0073722 | A1 | * | 3/2016 | Eustace | G08B 21/18 |
| | | | | | 340/539.13 |
| 2016/0106174 | A1 | * | 4/2016 | Chung | A42B 3/0433 |
| | | | | | 340/539.13 |
| 2016/0171864 | A1 | * | 6/2016 | Ciaramelletti | A42B 3/046 |
| | | | | | 340/539.12 |
| 2016/0260046 | A1 | | 9/2016 | Cai | |
| 2016/0354014 | A1 | | 12/2016 | Lobner | |
| 2017/0006931 | A1 | * | 1/2017 | Guez | A61B 5/0476 |
| 2017/0032255 | A1 | * | 2/2017 | Chandra | G06Q 10/0635 |
| 2017/0209092 | A1 | * | 7/2017 | Crisco, III | A42B 3/046 |
| 2017/0372216 | A1 | * | 12/2017 | Awiszus | G06N 7/005 |
| 2017/0374436 | A1 | * | 12/2017 | Awiszus | G06F 16/24568 |
| 2018/0108236 | A1 | * | 4/2018 | Kanukurthy | A62B 18/08 |
| 2020/0046040 | A1 | * | 2/2020 | Kanukurthy | G02B 5/122 |

OTHER PUBLICATIONS

Swimmno, "Swimmo—Smart Swim Watch Swimming Training, Swim Lap Counter," [retrieved from the internet on Jul. 7, 2017], URL <http://www.swimmo.com/?gclid=CMPNhfXYy9Q-CFQS1wAodzmEC-A>, 9 pages.

Urban Wearables, "Best Fitness Trackers Built for Swimming," 2016, [retrieved from the internet on Jul. 7, 2017], URL <http://urbanwearables.technology/best-fitness-trackers-built-for-swimming/>, 18 pages.

* cited by examiner

400 ↘

| Target Entity: | Facility XYZ | 402 |

Enter Time Period: | 01/2017 - 08/2017 |
404

Select Benchmarks:
406 ○ Number of accidents
408 ○ Total cost of accidents
410 ○ Number of deaths
412 ○ Total missed time

FIG. 4

PERSONAL PROTECTIVE EQUIPMENT AND SAFETY MANAGEMENT SYSTEM FOR COMPARATIVE SAFETY EVENT ASSESSMENT

TECHNICAL FIELD

The present disclosure relates to worker safety and computing systems related to improving worker safety.

BACKGROUND

Many work environments include hazards that may expose people working within a given environment to a safety event, such as a fall, breathing contaminated air, temperature related injuries (e.g., heat stroke, frostbite, etc.) and the like. Workers may utilize personal protective equipment (PPE) to help protect the workers from harm or injury. Companies that operate work environments track metrics relating to safety events that bear on the safety of workers operating within the work environments. Examples of safety events include accidental deaths, injury, near-misses, planned or unplanned exposure to hazards, wastage, and accident costs.

SUMMARY

In general, the present disclosure describes techniques for identifying clusters of entities and comparing, with respect to safety events experienced, relative performances of the entities and the clusters of entities. The entities compared may represent, for example, different work environments, groups of workers, or individual workers.

A worker may utilize personal protective equipment (PPE) that includes one or more physiological sensors that monitor corresponding physiological conditions, movements, or other physiological characteristics of the worker in a work environment and provide the physiological data indicating the physiological characteristics to a worker safety management system. The worker safety management system may receive data descriptive of characteristics of various entities along one or more different dimensions that may affect safety events experienced by the entities and that may be used to cluster the entities in a dimensional space defined by the dimensions. The various characteristics along the dimensions may include, for instance, the physiological data for one or more workers, the types of safety products (such as PPE) used by or within the entity, the utilization of the safety products by the entities, geographic location, number of workers and/or worker demographic information, worker scheduling, training data, volumes and types of jobs performed, and types and numbers of occurrence of safety events experienced by the entity. The characteristics may include categorical and/or continuous data. The worker safety management system processes the received data to identify clusters of entities in the space defined by the dimensions, with such identified clusters corresponding to one or more entities that are similar to one another with respect to the characteristics.

The worker safety management system may compare entities and clusters of entities to one another to determine and output differences in performance with respect to safety events. For instance, the worker safety management system may determine that, with respect to injuries experienced by worker, a target entity compares favorably to the average among entities in a cluster that includes the target entity. The worker safety management system may output an indication of this comparison to a user or other analysis system. The user or other analysis system may use this indication to aid in identifying those characteristics of the entities that correlate to safety events occurrences.

The techniques described in this disclosure may provide one or more technical advantages. For example, the techniques may improve worker safety management by enabling comparisons among entities that accounts for differences in the entities along the many dimensions of entity characteristics. This may reduce both false positives and false negatives of safety event assessments that may otherwise occur if a global comparison is used, i.e., between the target entity and all other entities in the entity population. For example, a first group of entities including a target entity may have similar characteristics that cause the worker safety management system to cluster the first group of entities into a first cluster, and a second group of entities may have similar characteristics that cause the worker safety management system to cluster the second group of entities into a second cluster. By assessing the performance of the target entity with respect to safety events relative to the first cluster of entities, the techniques may enable comparisons of similar entities and may provide a more accurate assessment, which may facilitate improvements to worker safety.

In one example, a system includes one or more personal protective equipment (PPE) devices each configured to be worn by a worker, the PPE devices each including one or more sensors that generate activity data indicative of activities of workers operating within one or more work environments. The system also includes a computing device, the computing device configured to: identify, based at least on the activity data, a plurality of clusters of one or more entities, wherein each entity of the entities is associated with one or more of the workers; and output an indication of a difference between performance by a target entity with respect to safety events and performance by the cluster that includes the target entity with respect to safety events.

In another example, a computing device includes: at least one processor; and memory comprising instructions that, when executed, cause the at least one processor to: receive entity data indicative of performance by one or more entities with respect to safety events; generate, from the entity data, respective d-dimensional vectors for the entities, wherein each of the d-dimensional vectors has a corresponding value for each dimension of the d dimensions that indicates a value in the dimension for the corresponding entity; process the d-dimensional vectors using a clustering algorithm to identify a plurality of clusters of the one or more entities, wherein each entity of the entities is associated with one or more workers; and output an indication of a difference between performance by a target entity with respect to safety events and performance by the cluster that includes the target entity with respect to safety events.

In another example, a computing device comprises at least one processor; and memory comprising instructions that, when executed, cause the at least one processor to: identify, based at least on activity data generated by one or more sensors included in one or more personal protective equipment (PPE) devices each configured to be worn by a worker, the activity data indicative of activities of workers operating within one or more work environments, a plurality of clusters of one or more entities, wherein each entity of the entities is associated with one or more workers; and output an indication of a difference between performance by a target entity with respect to safety events and performance by the cluster that includes the target entity with respect to safety events.

BRIEF DESCRIPTION OF THE DRAWINGS

FIG. 4 illustrates an example user interface of the worker safety management system, according to techniques of this disclosure.

It is to be understood that the embodiments may be utilized and structural changes may be made without departing from the scope of the invention. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
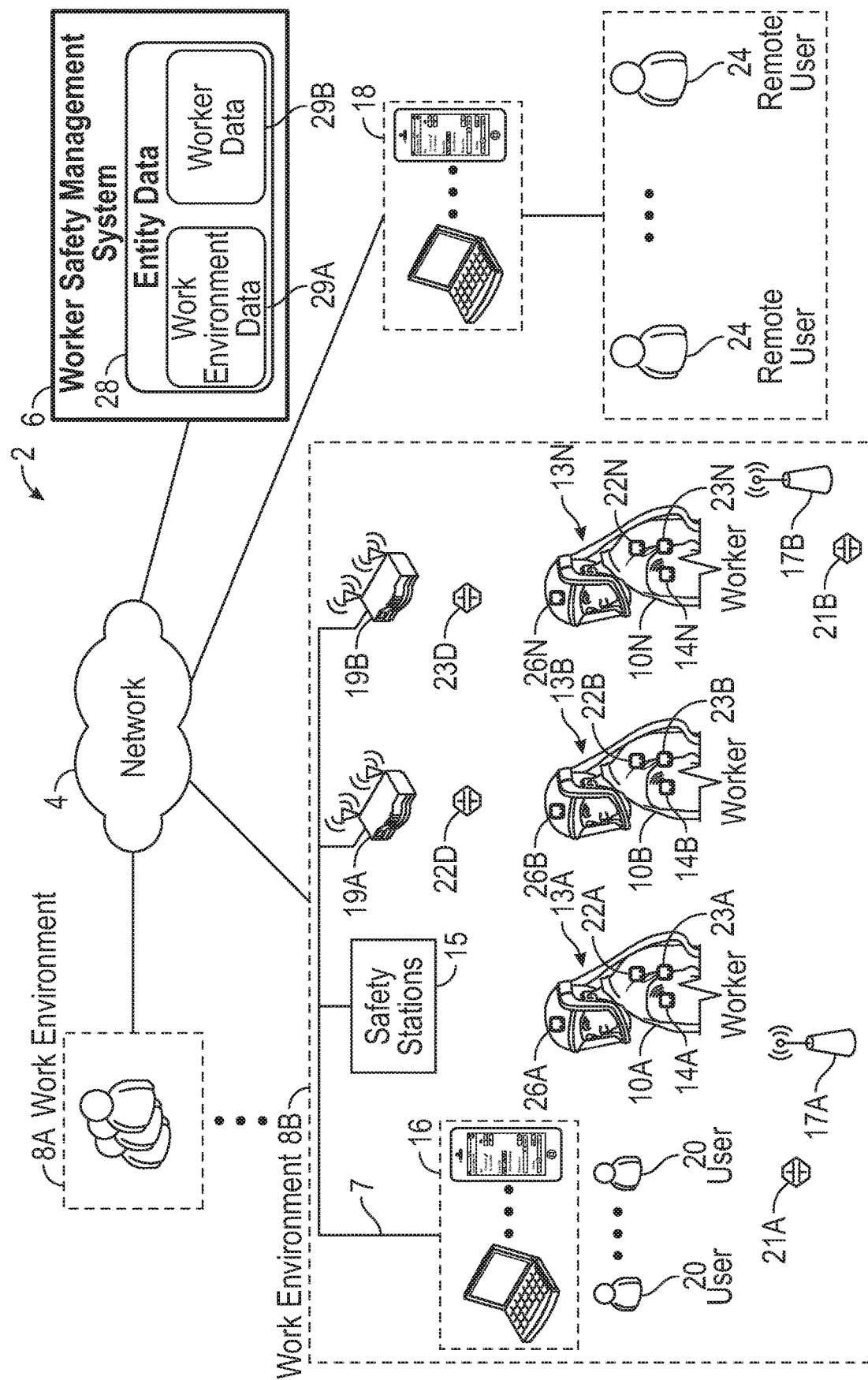
FIG. 1 is a block diagram illustrating an example system that includes a worker safety management system, in accordance with various techniques of this disclosure.

FIG. 1 is a block diagram illustrating an example system 2 that includes a worker safety management system (SMS) 6 for identifying clusters of entities and comparing, with respect to safety events experienced, relative performances of the entities and the clusters of entities, in accordance with techniques described in this disclosure. The entities compared may represent, for example, work environments, facilities, groups of workers, or individual workers.

In general, SMS 6 may provide data acquisition, monitoring, activity logging, reporting, predictive analytics, safety condition identification, and alert generation. For example, SMS 6 includes an underlying analytics and safety management engine and alerting system in accordance with various examples described herein. In general, SMS 6 may aid in identifying disparities among entities and thereby aid in mitigating risks to workers by identifying clusters of entities (e.g., workers, work environments, facilities that include one or more work environments, or the like) and determining a difference between safety performance of a target entity relative to other entities. SMS 6 may determine a difference between occurrences of safety events for a target entity relative to occurrences of safety events for a cluster of entities that includes the target entity, the entities clustered according to dimensions of categorical and or continuous entity characteristics of the entities in a corresponding multi-dimensional space.

For example, SMS 6 may determine a difference between performance with respect to safety events for a target worker relative to other workers in a particular work environment, determine a difference between performance with respect to safety events for a target work environment relative to other work environments, determine a difference between performance with respect to safety events for a target group of workers relative to other groups of workers, and/or determine a difference between performance with respect to safety events for a target work environment relative to other work environment. Examples of safety events may include worker activities, conditions or events relating to usage of articles of personal protective equipment (PPE), hazardous environmental conditions, accidental deaths, illness or injury, near-misses, planned or unplanned exposure to hazards, wastage, and costs of accidents. For example, in the context of hearing, vision, or head protection equipment, a safety condition may be such protection equipment being in a standby configuration. In the context of hazardous equipment, a safety condition may be proximity of a worker to the hazardous equipment. Worker illness or injury may include temperature related illness or injury, cardiac related illness or injury, respiratory related illness or injury, or eye or hearing related injury or illness, among other examples. Additional examples of safety events include falls, breathing contaminated air, exposure to radiation or chemicals, etc. Safety events may be categorized in some instance by type, e.g., "worker injuries," "all safety events," "exposure," and so forth.

In some examples, SMS 6 receives sensor data from sensors, such as motion sensors, physiological sensors, equipment sensors, to name only a few examples. By analyzing safety events and sensor data associated with workers, work environments, or both, SMS 6 may in such examples apply clustering and analysis techniques described herein to manage risks to workers in a manner that accounts for many different data streams and different types of data included in the data streams that may correlate to safety events and performance.

As further described below, SMS 6 may provide an integrated, end-to-end system for managing risk to workers 10 within one or more work environments 8, which may be construction sites, warehouses, manufacturing sites, or any physical environment. A facility may include one or more work environments. A work environment may be located outside of any enclosed facility and may not be associated with such a facility. The techniques of this disclosure may be realized within various parts of system 2.

As shown in the example of FIG. 1, system 2 includes a computing environment in which computing device(s) within a plurality of work environments 8A, 8B (collectively, work environments 8) electronically communicate with SMS 6 via one or more computer networks 4. Each of work environments 8 represents a physical environment in which one or more individuals, such as workers 10, engage in tasks or activities within the work environment.

In this example, work environment 8A is shown as generally as having workers 10, while work environment 8B is shown in expanded form to provide a more detailed example. As illustrated in the example of FIG. 1, work environment 8B includes a variety of sensors configured to monitor the work environment and workers 10 within work environment 8B. For examples, work environment 8B may include physiological sensors 22, motion sensors 23, environmental sensing stations 21, or the like.

Motion sensors 23A-23N (collectively, motion sensors 23) are configured to detect motion of a respective worker 10A-10N. Motion sensors 23 may include accelerometers, gyroscopes, magnetometers, or other types of motion sensors. In some examples, motion sensors 23 generate and output data indicative of acceleration in one or more dimensions. Similarly, motion sensors 23 may generate and output data indicative of a change in the orientation (e.g., direction) of a worker 10 in one or more dimensions. Motion sensors 23 may output data indicative of a quantity of steps taken, stairs climbed, or lifts performed by a respective worker of workers 10.

In some examples, one or more physiological sensors 22A-22D (collectively, physiological sensors 22) are configured to detect one or more physiological characteristics of one or more workers 10. Examples of physiological sensors 22 include a heart rate sensor (e.g., configured to detect a pulse or determine a heart rate of worker 10A), breathing sensor (e.g., configured to detect a breathing rate), temperature sensor (e.g., configured to detect a temperature of worker 10A), sweat sensor (e.g., configured to detect how much worker 10A is sweating), cutaneous or subcutaneous analyte sensor, among other examples. Physiological sensors 22 generate and output physiological data indicative of the one or more physiological characteristics detected from the one or more workers 10. For example, when physiological sensor 22A includes a heart rate sensor, the heart rate sensor may output data indicative of a heart rate of worker 10A. As another example, when physiological sensor 22A includes a temperature sensor, the temperature sensor may output data indicative of a temperature (e.g., core body temperature or skin temperature) of the worker 10A. In some examples, physiological sensors 22 may be included as part of personal protective equipment. For example, as illustrated in FIG. 1, PPE 13A-13N each include one or more physiological sensors 22A-22N. In some examples, one or more of physiological sensors 22 may be separate from any articles of personal protective equipment. For example, as illustrated in FIG. 1, physiological sensor 22D is physically distinct from any articles of personal protective equipment. Physiological sensor 22D may be worn by worker 10A (e.g., a so called smart-watch or activity tracker) or may be a remote sensor physically separate from worker 10A (e.g., an infrared camera that monitors the body temp of one or more workers 10).

As shown in the example of FIG. 1, work environment 8B may also contain one or more wireless-enabled beacons, such as beacons 17A-17B, that provide accurate location data within the work environment. For example, beacons 17A-17B may be GPS-enabled such that a controller within the respective beacon may be able to precisely determine the position of the respective beacon. Based on wireless communications with one or more of beacons 17, PPE 13, sensors 22, 23, 26, or communication hub 14 worn by a worker 10 are configured to determine the location of the worker within work environment 8B. In this way, event data reported to SMS 6 may be stamped with positional data to aid analysis, reporting and analytics performed by the SMS.

In addition, work environment 8B may also include one or more wireless-enabled sensing stations, such as sensing stations 21A, 21B. Each sensing station 21 includes one or more sensors and a controller configured to output data indicative of sensed environmental conditions. Moreover, sensing stations 21 may be positioned within respective geographic regions of work environment 8B or otherwise interact with beacons 17 to determine respective positions and include such positional data when reporting environmental data to SMS 6. As such, SMS 6 may be configured to correlate the sensed environmental conditions with the particular regions and, therefore, may utilize the captured environmental data when processing event data received from PPE 13, sensing stations 21, physiological sensors 22, or motion sensors 23. For example, SMS 6 may utilize the environmental data to aid generating alerts or other instructions for PPE 13 and for performing predictive analytics, such as determining any correlations between certain environmental conditions (e.g., heat, humidity, visibility) with abnormal worker behavior or increased safety events. As such, SMS 6 may utilize current environmental conditions to aid prediction and avoidance of imminent safety events. Example environmental conditions that may be sensed by sensing stations 21 include but are not limited to temperature, humidity, presence of various gasses, pressure, visibility, wind, ambient light, ambient noise, radiation, air quality, and the like. In other words, sensing stations 21 may include temperature sensors, moisture and/or humidity sensors, gas sensors, pressure sensors, light sensors, audio sensors, radiation sensors, and so forth. In some examples, sensing stations 21 may include camera configured to monitor movements of workers 10 while workers 10 are operating in the respective work environments 8.

In the example of FIG. 1, a plurality of workers 10A-10N are shown as utilizing PPE 13A-13N. However, in some examples, the techniques of this disclosure apply to workers that are not utilizing PPE. Although PPE 13 in the example of FIG. 1 are illustrated as respirators, the techniques described herein apply to other types of PPE, such as those for hearing protection, vision protection, and head protection, as well as protective clothing, trauma protection, other PPE for assisted/protective respiration, and so forth. In some examples, PPE 13 include computerized devices, such as a hub 14, watch (e.g., a smartwatch), fitness tracker, eyewear, headphones, mobile phone, heart rate monitor, pulse oximeter, or other wearable device that may include one or more physiological sensors 22.

Each of PPE 13 may in some examples include embedded sensors or monitoring devices and processing electronics configured to capture data (also referred to as data) in real-time as a user (e.g., worker) engages in activities while utilizing (e.g., wearing) the PPE. PPE 13 may include a number of equipment sensors 26 for sensing or controlling the operation of such components. A head top may include, as examples, a head top visor position sensor, a head top temperature sensor, a head top motion sensor, a head top impact detection sensor, a head top position sensor, a head top battery level sensor, a head-top head detection sensor, an ambient noise sensor, or the like. A blower may include, as examples, a blower state sensor, a blower pressure sensor, a blower run time sensor, a blower temperature sensor, a blower battery sensor, a blower motion sensor, a blower impact detection sensor, a blower position sensor, or the like. A filter may include, as examples, a filter presence sensor, a filter type sensor, or the like. Each of the above-noted equipment sensors may generate usage data, which may for example, indicate an operational status of a respective article of equipment (e.g., on, off, open, closed, operational, malfunctioning, amount of expected run time remaining, total run time in use, among many examples). In some examples, one or more articles of PPE worn by workers 10 include one or more physiological sensors 22, motion sensors 23, or both. In some examples, one or more articles of PPE worn by workers 10 include one or more sensing stations 21.

In addition, each of PPE 13 may include one or more output devices for outputting data that is indicative of operation of PPE 13 and/or generating and outputting communications to the respective worker 10. For example, PPE 13 may include one or more devices to generate audible feedback (e.g., one or more speakers), visual feedback (e.g., one or more displays, light emitting diodes (LEDs) or the like), or tactile feedback (e.g., a device that vibrates or provides other haptic feedback).

SMS 6 may include entity data 28 associated with one or more entities. An entity may represent a particular work environment of work environments 8, a particular worker of workers 10, a work environment, or a group of workers, for instance. In the example of FIG. 1, entity data 28 includes work environment data 29A indicative of characteristics of the work environments and worker data 29B indicative of characteristics of workers 10. In some examples, work environment data 29A and worker data 29B includes activity data from one or more sensors 21, 22, 23, and 26. For example, SMS 6 may receive activity data from the various sensors and store the activity data within work environment data 29A, worker data 29B, or both. SMS 6 may store entity data 28 locally. In some examples, SMS 6 may access entity data 28 stored separately (e.g., by an external computing system or data store).

Worker data 29B may include activity data associated with workers 10. In some examples, the activity data includes sensor data generated by motion sensors 23, physiological sensors 22, equipment sensors 26, or a combination therein. For example, SMS 6 may receive motion data from motion sensor 23A indicating a quantity (e.g., number) of steps taken by worker 10A, stairs climbed by worker 10A, falls experienced by worker 10A, lifts performed by worker 10A, etc. Similarly, SMS 6 may receive physiological data from physiological sensors 22 indicating a temperature (e.g., core temperature, skin temperature, or both) of worker 10A, heart rate of worker 10A, breathing rate of worker 10A, or the like. As another example, SMS 6 may receive equipment usage data indicating a frequency and/or duration of use an article of equipment (e.g., PPE) was utilized, such as a number of times a visor was opened, an amount of oxygen consumed by worker 10A, an amount of battery consumed, among other examples. In some examples, the activity data includes time spent at activities by the workers 10, continuous time spent by workers 10 per activity, duty cycles by workers 10, and activity patterns. SMS 6 may receive activity data generated by motion sensors 23, physiological sensors 22, and/or equipment sensors 26, which may include communication capabilities to communicate data directly to SMS 6 or indirectly via one or more communication devices (e.g., hubs 14) as described in further detail below.

In some examples, worker data 29B includes biographical data corresponding to workers 10 associated with a work environment, such as demographic data, worker type data (e.g., indicating a type of worker, such as welder, painter, etc.), work experience data (e.g., indicating a number of years of experience for respective workers 10), or training data (e.g., indicating trainings or skills obtained by respective workers 10), performance reviews, injury records, safety violation records, and the like.

In some examples, work environment data 29A includes data indicative of the characteristics of respective work environments 8. For example, work environment data 29A may indicate a size (e.g., building size, lot size, etc.), location (e.g., address, GPS coordinates), type of work environment (e.g., warehouse, office space, construction site, etc.), or type of work performed at each respective work environment. In some examples, work environment data 29A includes safety event statistics. Safety event statistics may include an indication of a quantity of safety events or accidents at each work environment, such as a number of falls experienced, number of exposure (e.g., excessive sound, radiation, etc.) incidents, total number of incidents, among others. In some examples, the work environment data 29A includes data indicating a quantity of workers at each respective work environment of work environments 8, average contract length at each respective work environment, quantity of contracts, types of work performed at each work environment, insurance data (e.g., quantity of insurance claims, costs of insurance claims), trainings provided at each work environment, among other types of data. In some examples, work environment data 29A includes data indicative of equipment with a work environment, such as type of PPE, PPE provider or manufacturer, PPE age, etc.

In general, each of work environments 8 include computing equipment (e.g., a local area network) by which motion sensors 23, physiological sensors 22, sensing stations 21, beacons 17, and/or PPE 13 (e.g., including equipment sensors 26) are able to communicate with SMS 6. For examples, work environments 8 may be configured with wireless technology, such as 802.11 wireless networks, 802.15 ZigBee networks, and the like. In the example of FIG. 1, work environment 8B includes a local network 7 that provides a packet-based transport medium for communicating with SMS 6 via network 4. Work environment 8B may include wireless access point 19 to provide support for wireless communications. In some examples, work environment 8B may include a plurality of wireless access points 19 that may be geographically distributed throughout the environment to provide support for wireless communications throughout the work environment.

In some examples, each worker 10 may be equipped with a corresponding one of wearable communication hubs 14A-14N that enable and facilitate wireless communication between SMS 6 and motion sensors 23, physiological sensors 22, sensing stations 21, beacons 17, and/or PPE 13. For example, motion sensors 23, physiological sensors 22, sensing stations 21, beacons 17, and/or PPE 13 may communicate with a respective communication hub 14 via wireless communication (e.g., Bluetooth or other short-range protocol), and the communication hubs may communicate with SMS 6 via wireless communications processed by wireless access point 19. Although shown as wearable devices, hubs 14 may be implemented as stand-alone devices deployed within work environment 8B.

In general, each of hubs 14 is programmable via SMS 6 so that local alert rules may be installed and executed without requiring a connection to the cloud. As such, each of hubs 14 provides a relay of activity data from motion sensors 23, physiological sensors 22, sensing stations 21, beacons 17, and/or PPE 13, and provides a local computing environment for localized alerting based on streams of events in the event communication with SMS 6 is lost.

In example implementations, an environment, such as work environment 8B, may also include one or more safety stations 15 distributed throughout the environment. Safety stations 15 may allow one of workers 10 to check out PPE 13 and/or other safety equipment, verify that safety equipment is appropriate for a particular one of work environments 8, and/or exchange data. Safety stations 15 may enable workers 10 to send and receive data from equipment sensors 26, motion sensors 23, physiological sensors 22, sensing stations 21, and/or beacons 17. For example, safety stations 15 may transmit alert rules, software updates, or firmware updates to PPE 13 or other equipment, such as motions sensor 23, physiological sensors 22, sensing stations 21, and/or beacons 17. Safety stations 15 may also receive data cached on PPE 13, hubs 14, motion sensors 23, physiological sensors 22, sensing stations 21, beacons 17, and/or other safety equipment. That is, while equipment such as motion sensors 23, physiological sensors 22, sensing stations 21, beacons 17, PPE 13, and/or data hubs 14 may typically transmit data via network 4 in real time or near real time, such equipment may not have connectivity to network 4 in some instances, situations, or conditions. In such cases, motion sensors 23, physiological sensors 22, sensing stations 21, beacons 17, PPE 13, and/or data hubs 14 may store data locally and transmit the data to safety stations 15 upon regaining connectivity to network 4. Safety stations 15 may then obtain the data from motion sensors 23, physiological sensors 22, sensing stations 21, beacons 17, PPE 13, and/or data hubs 14.

In addition, each of work environments 8 may include computing facilities that provide an operating environment for end-user computing devices 16 for interacting with SMS 6 via network 4. For example, each of work environments 8 typically includes one or more safety managers responsible for overseeing safety compliance within the environment. In general, each user 20 interacts with computing devices 16 to access SMS 6. Each of work environments 8 may include systems. Similarly, remote users 24 may use computing devices 18 to interact with SMS 6 via network 4. For purposes of example, the end-user computing devices 16 may be laptops, desktop computers, mobile devices such as tablets or so-called smart phones and the like.

Users 20, 24 interact with SMS 6 to control and actively manage many aspects of safely equipment utilized by workers 10, such as accessing and viewing usage records, analytics and reporting. For example, users 20, 24 may review usage data acquired and stored by SMS 6, where the usage data may include data specifying starting and ending times over a time duration (e.g., a day, a week, etc.), data collected during particular events, such as lifts of a PPE 13 visor, removal of PPE 13 from a worker 10, changes to operating parameters of PPE 13, status changes to components of PPE 13 (e.g., a low battery event), motion of workers 10, detected impacts to PPE 13 or hubs 14, sensed data acquired from the user, environment data, and the like. In addition, users 20, 24 may interact with SMS 6 to perform asset tracking and to schedule maintenance events for individual pieces of safety equipment, e.g., PPE 13, to ensure compliance with any procedures or regulations. SMS 6 may allow users 20, 24 to create and complete digital checklists with respect to the maintenance procedures and to synchronize any results of the procedures from computing devices 16, 18 to SMS 6.

Further, SMS 6 may integrate an event processing platform configured to process thousand or even millions of concurrent streams of events from digitally enabled devices, such as motion sensors 23, physiological sensors 22, sensing stations 21, beacons 17, PPE 13, and/or data hubs 14. An underlying analytics engine of SMS 6 may apply historical data and models to the inbound streams to compute assertions, such as identified anomalies or predicted occurrences of safety events based on conditions or behavior patterns of workers 10.

Further, SMS 6 may provide real-time alerting and reporting to notify workers 10 and/or users 20, 24 of any predicted events, anomalies, trends, and the like. The analytics engine of SMS 6 may, in some examples, apply analytics to identify relationships or correlations between sensed worker data, environmental conditions, geographic regions and other factors and analyze the impact on safety events. SMS 6 may determine, based on the data acquired across populations of workers 10, which particular activities, possibly within certain geographic region, lead to, or are predicted to lead to, unusually high occurrences of safety events.

In this way, SMS 6 may tightly integrate comprehensive tools for managing personal protective equipment with an underlying analytics engine and communication system to provide data acquisition, monitoring, activity logging, reporting, behavior analytics and alert generation. Moreover, SMS 6 may provides a communication system for operation and utilization by and between the various elements of system 2. Users 20, 24 may access SMS to view results on any analytics performed by SMS 6 on data acquired from workers 10. In some examples, SMS 6 may present a web-based interface via a web server (e.g., an HTTP server) or client-side applications may be deployed for devices of computing devices 16, 18 used by users 20, 24, such as desktop computers, laptop computers, mobile devices such as smartphones and tablets, or the like.

In some examples, SMS 6 may provide a database query engine for directly querying SMS 6 to view acquired safety data, compliance data and any results of the analytic engine, e.g., by the way of dashboards, alert notifications, reports and the like. That is, users 20, 24 or software executing on computing devices 16, 18, may submit queries to SMS 6 and receive data corresponding to the queries for presentation in the form of one or more reports or dashboards. Such dashboards may provide various insights regarding system 2, such as baseline ("normal") operation across worker populations, identifications of any anomalous workers engaging in abnormal activities that may potentially expose the worker to risks, identifications of any geographic regions within work environments 8 for which unusually anomalous (e.g., high) safety events have been or are predicted to occur, identifications of any of work environments 8 exhibiting anomalous occurrences of safety events relative to other environments, and the like.

As illustrated in detail below, SMS 6 may simplify workflows for individuals charged with monitoring and ensure safety compliance for an entity or environment. That is, SMS 6 may enable active safety management and allow an organization to take preventative or correction actions with respect to certain regions within work environment 8, particular pieces of safety equipment or individual workers 10, define and may further allow the entity to implement workflow procedures that are data-driven by an underlying analytical engine.

As one example, the underlying analytical engine of SMS 6 may be configured to compute and present customer-defined metrics for worker populations within a given work environment 8 or across multiple work environments for an organization as a whole. For example, SMS 6 may be configured to acquire data and provide aggregated performance metrics and predicted behavior analytics across a worker population (e.g., across workers 10 of either or both of work environments 8A, 8B). Furthermore, users 20, 24 may set benchmarks for occurrence of any safety incidents, and SMS 6 may track actual performance metrics relative to the benchmarks for individuals or defined worker populations.

As another example, SMS 6 may further trigger an alert if certain combinations of conditions are present, e.g., to accelerate examination or service of a safety equipment, such as one of PPE 13. In this manner, SMS 6 may identify individual PPE 13 or workers 10 for which the metrics do not meet the benchmarks and prompt the users to intervene and/or perform procedures to improve the metrics relative to the benchmarks, thereby ensuring compliance and actively managing safety for workers 10.

In accordance with techniques of this disclosure, SMS 6 may manage risks to a worker operating within a work environment at least in part by determining a difference between safety performance of a given, target entity relative to safety performance of a cluster of entities that include the target entity to inform workers or safety managers of facilities and/or workers that are higher risk relative to other workers and/or work environments that are more similar to the target entity that the population of entities as a whole.

SMS 6 identifies clusters of entities that are each associated with one or more workers 10. SMS 6 may identify a plurality of clusters of one or more entities based at least in part on activity data indicative of activities of workers 10 operating within one or more of work environments 8. SMS 6 may identify the plurality of clusters of entities based on one or more rules. In some instances, the rules may be preprogrammed. As another example, the one or more rules may be generated by one or more models using machine learning or may themselves represent a machine learning model for identifying clusters and mapping target entities to clusters. Accordingly, description herein of a cluster of entities that "includes" another entity, such as a target entity for analysis, may refer to rules that map the entity to the cluster of entities, whether or not the entity was used by SMS 6 to identify the cluster of entities.

For example, the one or more models utilizes a clustering algorithm (e.g., k-means, k-means++, spectral clustering, hierarchical clustering, and DBSCAN) to determine or identify clusters of entities that are similar to one another. SMS 6 may group or cluster workers 10 into different groups of workers that are similar to one another, group or cluster work environments 8 into different groups of work environments that are similar to one another, or both. In instances where the one or more models uses clustering algorithms, SMS 6 may apply the one or more models to cluster workers 10 or work environments 8 into a particular number of clusters. In such instances, the number of clusters may be pre-defined or experimentally determined. In some examples, each cluster may include a different number of entities.

In some examples, SMS 6 may identify clusters of entities that are similar to a target entity utilizing a similarity algorithm (e.g., k-NN or cosine similarity). For example, SMS 6 may apply one or more models to determine, given a particular target entity, a cluster of entities most similar to the target entity. In some instances where a similarity algorithm is used, a cluster may include a pre-determined number of similar entities (e.g., the top 10 most similar entities to a target entity). In other words, in some scenarios, SMS 6 may input an indication a target worker or work environment to one or more models and may output, based on the one or more models, an indication of workers or work environments, respectively, determined to be the most similar to the target worker or work environment.

The one or more models may receive, as inputs, an indication of entity data 29 associated with a target entity, activity data (e.g., from motion sensors 23, physiological sensors 22, and/or equipment sensors 26) associated with the target entity, or a combination therein, and may output an indication of the clusters based on the inputs. In some examples, SMS 6 determines or identifies a cluster of workers similar to a target worker (e.g., worker 10A) based on activity data associated with target worker 10A and activity data associated with other workers 10. For example, activity data associated with worker 10A may indicate worker 10A takes an average of 10,000 steps each day and climbs an average of 100 flights of stairs. SMS 6 may apply the one or more models to activity data associated with worker 10A and other workers 10 to identify a subset of workers 10 with activity data most similar to the activity data for worker 10A. In one scenario, SMS 6 may identify a cluster of work environment similar to a target work environment (e.g., work environment 8B) based on activity data associated with target work environment 8B and activity data associated with other work environments 8. For instance, activity data associated with work environment 8B may indicate that workers working within work environment 8B typically consume 18L of pressurized oxygen (e.g., from a SCBA tank). In such scenarios, SMS 6 may apply the one or more models to activity data associated with work environment 8B to identify a subset of work environments 8 that are most similar to work environment 8B.

In some instances, SMS 6 may apply one or more models to entity data associated with a target entity to identify similar entities. For instance, when the entity data includes biographical data associated with a target worker (e.g., worker 10A), SMS 6 may identify a subset of workers 10 that are most similar to the target worker 10A based on the biographical data for workers 10. As another example, when the entity data includes work environment data, SMS 6 may apply one or more models to work environment data associated with a target work environment (e.g., work environment 8B) and may identify a subset of work environments 8 that are most similar to target work environment 8B based on work environment data for work environments 8.

Responsive to identifying a cluster of entities, SMS 6 may determine a difference between performance by a target entity with respect to safety events and performance of the cluster that includes the target entity. For example, SMS 6 may determine a difference between performance by a target entity with respect to safety events and performance of the cluster that includes the target entity with respect to safety events. In other words, SMS 6 may determine differences in safety performance of a target entity relative to a cluster of similar entities. In some examples, SMS 6 may determine the difference between performance by the target entity relative to the performance of the cluster by determining the performance for each entity in a cluster of entities that includes the target entity. For example, SMS 6 may determine a safety metric for each entity in the cluster of entities. In other words, SMS 6 may determine a safety metric for each worker in a cluster of workers 10, for each work environment in a cluster of work environments 8, or both. In some examples, SMS 6 determines the safety metric based on safety data stored in entity data 28. For example, work environment data 29A and/or worker data 29B may include data indicating a quantity of safety events associated with each work environment or worker, respectively. In some examples, the safety data indicates a number of worker deaths, a number of worker accidents, a total cost of worker accidents, missed time due to worker accidents, etc. In some examples, the safety data be stored external to SMS 6 and may be accessible to SMS 6. SMS 6 may determine the performance of each entity in the cluster (the cluster including the target entity) with respect to safety events based on the safety data. That is, in an example where target work environment 8B is included in a cluster of 50 similar work environments, SMS 6 may determine a safety metric for each of the 50 work environments.

Responsive to determining the safety metric for each entity in the cluster of entities that includes the target entity, SMS 6 may output an indication of the difference between performance of the target entity and the performance of the cluster. For example, as further illustrated in FIG. 3, SMS 6 may output a graphical user interface 300 indicating of performance for each entity of a cluster of entities 302, including an indication of the mean (e.g., average) performance of the cluster of entities 302 and the performance of target entity 320 that maps to the cluster of entities 302.

In some examples, SMS 6 may determine a difference between performance of a target entity relative to performance of a cluster of entities that include the target entity with respect to tasks associated with workers 10. In other words, SMS 6 may determine differences in task performance of a target entity relative to a cluster of entities similar to the target entity. In some examples, SMS 6 may receive activity data indicative of one or more performance metrics for workers 10. For example, the activity data may be indicative of tasks performed by workers 10. In some examples, the activity data includes equipment data indicating when an article of equipment is turned on/off, such that SMS 6 may determine that worker 10A is performing a particular task at a particular time based on equipment data by detecting when the particular article of equipment is turned on or off. In such examples, SMS 6 may determine a performance metric, such as worker productivity, associated with worker 10A while worker 10A performs a task corresponding to the particular article of equipment.

In some examples, the activity data may include motion data generated by one or more motion sensors associated with worker 10A. For example, SMS 6 may receive motion data from a motion tracker (e.g., step counter) worn by worker 10A and may determine a quantity of time worker 10A performs a task based on the motion data. Similarly, SMS 6 may determine a performance metric (e.g., quantity of time to perform a task) for other workers 10.

As another example, SMS 6 may determine a performance metric associated with a target work environment 8B relative to a cluster of work environments 8 that includes work environment 8B. For example, SMS 6 may receive activity data indicating that a particular article of equipment (e.g., a crane at a construction site) within target work environment 8B only operates a certain amount of time (e.g., due to other equipment getting in the way) and determine the amount of time that similar corresponding articles of equipment (e.g., equipment of the same type, such as cranes) operate at work environments in a cluster of work environments that include work environment 8B (e.g., other construction sites) operate.

Responsive to determining the performance metric for the target entity and the performance metric for other entities in the cluster of related entities, SMS 6 may output an indication of a difference between the performance of the target entity and the performance of the cluster of entities that include the target entity. As one example, SMS 6 may output, for display by a display device, a graphical user interface indicating the performance metric for the target entity, a performance metric for the cluster (e.g., an average for the cluster), a performance metric for each entity in the cluster, a visualization of the clusters, or a combination thereof. SMS 6 may output a rank, with respect to the difference, of the target entity against the cluster of entities that includes the entity, an absolute difference, a relative difference, a visualization, or other indication of the difference. The indication may be used by a user or analysis system to identify characteristics of entities that correlate to performance with respect to worker activities, such as safety events.

In this way, techniques of disclosure enable a worker safety management system to improve worker safety management using technical improvements to comparison techniques described herein that enable comparisons among entities that account for differences in the entities along the one or more dimensions of entity characteristics. By comparing entities in view of characteristics of the entities that account for differences between entities, the worker safety management system may reduce both false positives and false negatives of safety event assessments. In this way, the techniques of this disclosure describe technical features that may enable a worker safety management system to provide a more accurate assessment of safety events, which may facilitate improvements to worker safety.

Figure 2:
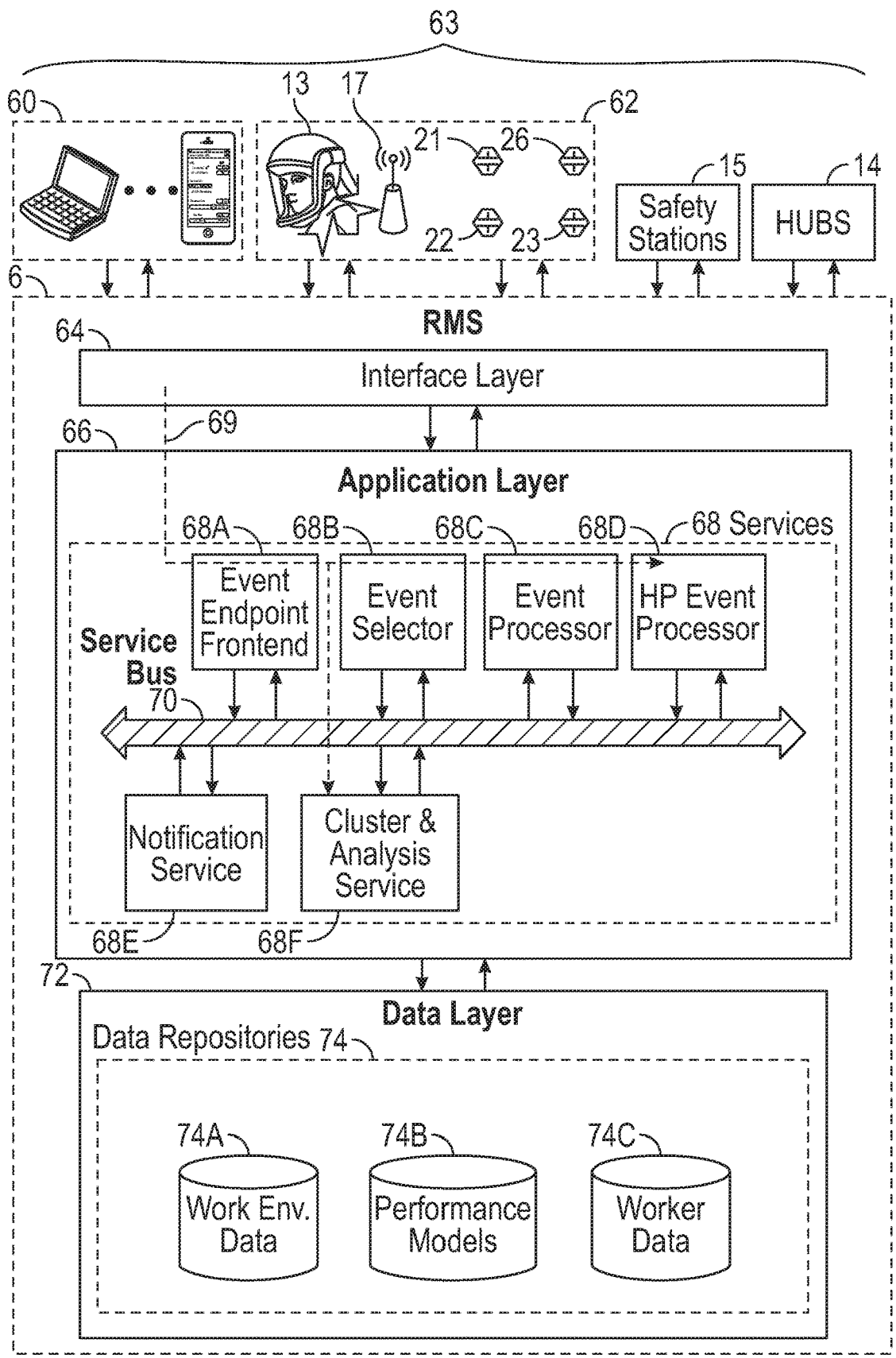
FIG. 2 is a block diagram illustrating, in detail, an operating perspective of the safety management system shown in FIG. 1.

FIG. 2 is a block diagram providing an operating perspective of SMS 6 when hosted as cloud-based platform capable of supporting multiple, distinct work environments 8 having an overall population of workers 10, in accordance with techniques described herein. In the example of FIG. 2, the components of SMS 6 are arranged according to multiple logical layers that implement the techniques of the disclosure. Each layer may be implemented by one or more modules comprised of hardware, software, or a combination of hardware and software.

In FIG. 2, safety equipment 62 include personal protective equipment (PPEs) 13, beacons 17, sensing stations 21, physiological sensors 22, and motion sensors 23. Safety equipment 62, HUBs 14, safety stations 15, as well as computing devices 60, operate as clients 63 that communicate with SMS 6 via interface layer 64. Computing devices 60 typically execute client software applications, such as desktop applications, mobile applications, and web applications. Computing devices 60 may represent any of computing devices 16, 18 of FIG. 1. Examples of computing devices 60 may include but are not limited to a portable or mobile computing device (e.g., smartphone, wearable computing device, tablet), laptop computers, desktop computers, smart television platforms, and servers, to name only a few examples.

Client applications executing on computing devices 60 may communicate with SMS 6 to send and receive data that is retrieved, stored, generated, and/or otherwise processed by services 68. For instance, the client applications may request and edit safety event data including analytical data stored at and/or managed by SMS 6. In some examples, client applications may request and display aggregate safety event data that summarizes or otherwise aggregates numerous individual instances of safety events and corresponding data obtained from safety equipment 62 and/or generated by SMS 6. The client applications may interact with SMS 6 to query for analytics data about past and predicted safety events, behavior trends of workers 10, to name only a few examples. In some examples, the client applications may output for display data received from SMS 6 to visualize such data for users of clients 63. As further illustrated and described in below, SMS 6 may provide data to the client applications, which the client applications output for display in user interfaces.

Clients applications executing on computing devices 60 may be implemented for different platforms but include similar or the same functionality. For instance, a client application may be a desktop application compiled to run on a desktop operating system or a mobile application compiled to run on a mobile operating system. As another example, a client application may be a web application such as a web browser that displays web pages received from SMS 6. In the example of a web application, SMS 6 may receive requests from the web application (e.g., the web browser), process the requests, and send one or more responses back to the web application. In this way, the collection of web pages, the client-side processing web application, and the server-side processing performed by SMS 6 collectively provides the functionality to perform techniques of this disclosure. In this way, client applications use various services of SMS 6 in accordance with techniques of this disclosure, and the applications may operate within various different computing environment (e.g., embedded circuitry or processor of a PPE, a desktop operating system, mobile operating system, or web browser, to name only a few examples).

As shown in FIG. 2, SMS 6 includes an interface layer 64 that represents a set of application programming interfaces (API) or protocol interface presented and supported by SMS 6. Interface layer 64 initially receives messages from any of clients 63 for further processing at SMS 6. Interface layer 64 may therefore provide one or more interfaces that are available to client applications executing on clients 63. In some examples, the interfaces may be application programming interfaces (APIs) that are accessible over a network. Interface layer 64 may be implemented with one or more web servers. The one or more web servers may receive incoming requests, process and/or forward data from the requests to services 68, and provide one or more responses, based on data received from services 68, to the client application that initially sent the request. In some examples, the one or more web servers that implement interface layer 64 may include a runtime environment to deploy program logic that provides the one or more interfaces. As further described below, each service may provide a group of one or more interfaces that are accessible via interface layer 64.

In some examples, interface layer 64 may provide Representational State Transfer (RESTful) interfaces that use HTTP methods to interact with services and manipulate resources of SMS 6. In such examples, services 68 may generate JavaScript Object Notation (JSON) messages that interface layer 64 sends back to the client application of clients 60 that submitted the initial request. In some examples, interface layer 64 provides web services using Simple Object Access Protocol (SOAP) to process requests from client applications. In still other examples, interface layer 64 may use Remote Procedure Calls (RPC) to process requests from clients 63. Upon receiving a request from a client application to use one or more services 68, interface layer 64 sends the data to application layer 66, which includes services 68.

As shown in FIG. 2, SMS 6 also includes an application layer 66 that represents a collection of services for implementing much of the underlying operations of SMS 6. Application layer 66 receives data included in requests received from client applications and further processes the data according to one or more of services 68 invoked by the requests. Application layer 66 may be implemented as one or more discrete software services executing on one or more application servers, e.g., physical or virtual machines. That is, the application servers provide runtime environments for execution of services 68. In some examples, the functionality interface layer 64 as described above and the functionality of application layer 66 may be implemented at the same server.

Application layer 66 may include one or more separate software services 68, e.g., processes that communicate, e.g., via a logical service bus 70 as one example. Service bus 70 generally represents logical interconnections or set of interfaces that allows different services to send messages to other services, such as by a publish/subscription communication model. For instance, each of services 68 may subscribe to specific types of messages based on criteria set for the respective service. When a service publishes a message of a particular type on service bus 70, other services that subscribe to messages of that type will receive the message. In this way, each of services 68 may communicate data to one another. As another example, services 68 may communicate in point-to-point fashion using sockets or other communication mechanisms. Before describing the functionality of each of services 68, the layers are briefly described herein.

Data layer 72 of SMS 6 represents a data repository that provides persistence for data in SMS 6 using one or more data repositories 74. A data repository, generally, may be any data structure or software that stores and/or manages data. Examples of data repositories include but are not limited to relational databases, multi-dimensional databases, maps, and hash tables, to name only a few examples. Data layer 72 may be implemented using Relational Database Management System (RDBMS) software to manage data in data repositories 74. The RDBMS software may manage one or more data repositories 74, which may be accessed using Structured Query Language (SQL). Data in the one or more databases may be stored, retrieved, and modified using the RDBMS software. In some examples, data layer 72 may be implemented using an Object Database Management System (ODBMS), Online Analytical Processing (OLAP) database or other suitable data management system.

As shown in FIG. 2, each of services 68A-68J ("services 68") is implemented in a modular form within SMS 6. Although shown as separate modules for each service, in some examples the functionality of two or more services may be combined into a single module or component. Each of services 68 may be implemented in software, hardware, or a combination of hardware and software. Moreover, services 68 may be implemented as standalone devices, separate virtual machines or containers, processes, threads or software instructions generally for execution on one or more physical processors. In some examples, one or more of services 68 may each provide one or more interfaces that are exposed through interface layer 64. Accordingly, client applications of computing devices 60 may call one or more interfaces of one or more of services 68 to perform techniques of this disclosure.

In accordance with techniques of the disclosure, services 68 may include an event processing platform including an event endpoint frontend 68A, event selector 68B, event processor 68C, high priority (HP) event processor 68D, notification service 68E, and cluster & analysis service (CAS) 68F.

Event endpoint frontend 68A operates as a frontend interface for exchanging communications with hubs 14 and safety equipment 62. In other words, event endpoint frontend 68A operates to as a frontline interface to safety equipment deployed within work environments 8 and utilized by workers 10. In some instances, event endpoint frontend 68A may be implemented as a plurality of tasks or jobs spawned to receive individual inbound communications of event streams 69 that include data sensed and captured by the safety equipment 62. When receiving event streams 69, for example, event endpoint frontend 68A may spawn tasks to quickly enqueue an inbound communication, referred to as an event, and close the communication session, thereby providing high-speed processing and scalability. Each incoming communication may, for example, carry data recently captured data representing sensed conditions, motions, temperatures, actions or other data, generally referred to as events. Communications exchanged between the event endpoint frontend 68A and safety equipment 62 and/or hubs 14 may be real-time or pseudo real-time depending on communication delays and continuity.

Event selector 68B operates on the stream of events 69 received from safety equipment 62 and/or hubs 14 via frontend 68A and determines, based on rules or classifications, priorities associated with the incoming events. For example, safety rules may indicate that incidents of incorrect equipment for a given environment, incorrect usage of PPEs, or lack of sensor data associated with a worker's vital signs are to be treated as high priority events. Based on the priorities, event selector 68B enqueues the events for subsequent processing by event processor 68C or high priority (HP) event processor 68D. Additional computational resources and objects may be dedicated to HP event processor 68D so as to ensure responsiveness to critical events, such as incorrect usage of PPEs, lack of vital signs, and the like. Responsive to processing high priority events, HP event processor 68D may immediately invoke notification service 68E to generate alerts, instructions, warnings or other similar messages to be output to safety equipment 62, hubs 14, or devices used by users 20, 24. Events not classified as high priority are consumed and processed by event processor 68C.

In general, event processor 68C or high priority (HP) event processor 68D operate on the incoming streams of events to update one or more data repositories 74. For example, in some instances, work environment data 74A and/or worker data 74C may include entire streams of activity data obtained from sensing stations 21, physiological sensors 22, motion sensors 23, and/or equipment sensors 26. In other instances, work environment data 74A and/or worker data 74C may include a subset of such data, e.g., associated with a particular time period.

Event processors 68C, 68D may create, read, update, and delete event data stored in data repositories 74. For example, work environment data 74A and/or worker data 74C may store activity data in a respective database record as a structure that includes name/value pairs of data, such as data tables specified in row/column format. For instance, a name (e.g., column) may be "worker ID" and a value may be an employee identification number. An event record may include data such as, but not limited to: worker identification, acquisition timestamp(s) and data received from one or more articles of safety equipment 62 (e.g., sensing stations 21, physiological sensors 22, motion sensors 23, and/or equipment sensors 26).

In accordance with techniques of this disclosure, CAS 68F may determine a difference between performance of a given, target entity relative to performance of a cluster of entities that include the target entity. For example, CAS 68F may determine a cluster of entities that include a target entity, determine performance of the target entity and performance of the cluster, and output an indication of the difference between performance.

In some examples, CAS 68F determines clusters of entities based on respective entity profiles. CAS 68F generates an entity profile based on the work environment data 74A, worker data 74C, or both. In other words, CAS 68F may generate a worker profile associated with each respective worker of workers 10 or a work environment profile associated with each work environment of work environments 8. For example, CAS 68F may generate the entity profile associated with a worker by pre-processing or transforming the data (e.g., work environment data and/or worker data, which may include activity data) associated with a particular worker into a d-dimensional vector associated with each respective worker, where d is a positive integer. In some examples, CAS 68F may transform work environment data and/or worker data using techniques such as one-hot encoding (e.g., when work environment data and/or worker data includes categorical variables), natural language processing techniques (e.g., when work environment data and/or worker data includes text data), data normalization (e.g., making all data zero mean and unit variance), among others. In this way, CAS 68F generates an entity profile as a d-dimensional vector representative of each respective entity, where each of the d dimensions represents a variable associated with a given entity, with the d dimensions used by CAS 68F to determine differences in performance of various entities. Variables of the d dimensions may include categorical data (e.g., type of work environment, zip code, owner) or continuous data (e.g., number of workers, worker age, recent worker activities, training data).

CAS 68F may generate a d×n dimensional matrix, where d represents the number of dimensions or variables of data for each entity and n represents the number of entities. In other words, CAS 68F may combine the respective d-dimensional vectors for n entities to generate a generate a matrix M representing the activity data and entity data for each entity to be analyzed.

In some examples, CAS 68F identifies a cluster of entities that include a target entity. CAS 68F may be configured to determine the cluster of entities based on a target entity based at least in part on one or more rules. Although other technologies can be used, in some examples, the one or more rules are generated using machine learning. That is, CAS 68F may include executable code generated by application of machine learning to determine a cluster of entities associated with a target entity. The executable code may take the form of software instructions or rule sets and is generally referred to as a model that can subsequently be applied to activity data, entity data, or both. Example machine learning techniques that may be employed to generate performance models 74B can include various learning styles, such as supervised learning, unsupervised learning, and semi-supervised learning. Example types of algorithms include clustering algorithms or similarity algorithms. Additional types of algorithms include Bayesian algorithms, decision-tree algorithms, regularization algorithms, regression algorithms, instance-based algorithms, artificial neural network algorithms, deep learning algorithms, dimensionality reduction algorithms and the like. Various examples of specific algorithms include Bayesian Linear Regression, Boosted Decision Tree Regression, and Neural Network Regression, Back Propagation Neural Networks, the Apriori algorithm, K-Means Clustering, k-Nearest Neighbor (kNN), Learning Vector Quantization (LUQ), Self-Organizing Map (SOM), Locally Weighted Learning (LWL), Ridge Regression, Least Absolute Shrinkage and Selection Operator (LASSO), Elastic Net, and Least-Angle Regression (LARS), Principal Component Analysis (PCA) and Principal Component Regression (PCR).

CAS 68F may, in some example, generate separate models for a particular worker, a particular population of workers 10, a particular work environment, a particular population of work environments 8, or combinations thereof. CAS 68F may update the models based on work environment data 74A and/or worker data 74C associated with one or more of workers 10, one or more of work environments 8, or a combination thereof. For example, CAS 68F may update one or more models 74B based on historical activity data (e.g., physiological data generated by physiological sensors 22) stored in data 74A or 74C.

CAS 68F may identify a cluster of entities that include a target entity based at least in part by applying one or more performance models 74B to work environment data 74A and/or worker data 74C. For example, CAS 68F may identify a cluster of workers 10 that are similar to worker 10A of FIG. 1 by applying models 74B to worker data 74C associated with workers 10. In such examples, the cluster of workers includes a target worker 10A and a subset of workers 10, the subset of workers including workers determined by CAS 68F to be similar to worker 10A. As another example, CAS 68F may identify a cluster of work environments 8 that are similar to work environment 8B by applying models 74B to work environment data 74A associated with work environments 8. In such examples, the cluster of work environments includes a target work environment 8B and a subset of work environments 8, the subset of work environments including work environments determined to be similar to work environment 8B.

In some examples, CAS 68F may generate a cluster of entities based on application of one or more performance models 74B (e.g., utilizing a clustering algorithm) once, periodically to account for additional entities being added to the dataset over time, or before each target entity mapping to account for additional entities being added to the dataset over time. CAS 68F may perform a clustering algorithm to analyze the entities one or more times and assign each entity to a particular cluster based on the analysis. In this way, CAS 68F may not need to re-run the clustering algorithm each time CAS 68F determines performance of a target entity relative to other similar entities. In such examples, upon receiving data for a new entity (e.g., a new worker or new work environment), CAS 68F may determine which cluster to assign the new entity without re-running the clustering algorithm.

In examples where CAS 68F generates clustering using a similarity algorithm, CAS 68F may determine a predetermined quantity of entities that are most similar to the target entity to generate the cluster of entities that includes the target entity. In some examples, CAS 68F may re-run the similar algorithm in response to receiving data for a new entity to determine which cluster to assign the new entity.

Responsive to identifying a cluster of entities that includes a target entity, CAS 68F may determine a difference between performance by a target entity and performance of one or more entities in the cluster of entities. In some examples, CAS 68F may automatically determine the difference between performance, for example, on a periodic basis (e.g., hourly, daily, weekly, and so forth). As another example, CAS 68F may determine the difference between performance in response to receiving a query from a user of computing devices 60.

In some instances, CAS 68F determine a difference between performance with respect to safety events. For example, may determine the difference between performance in response to receiving a query indicating a target entity and a safety metric (e.g., quantity of accidents, quantity of injuries, quantity of insurance claims, etc.) for comparison from a user of computing devices 60. CAS 68F may determine a value for the safety metric for the target entity, for example, based on safety data stored in work environment data 74A and/or worker data 74C. Similarly, CAS 68F may determine a value for the safety metric for the cluster of entities that include the target entity, a value for the safety metric for each respective entity in the cluster of entities, or both.

According to some scenarios, CAS 68F may determine a difference between performance with respect to tasks associated with workers 10. CAS 68F may determine one or more tasks performed by a target worker 10A. In some examples, CAS 68F determines a task performed by target worker 10A based on activity data generated by one or more sensors (e.g., motion sensors 23 or physiological sensors 22) associated with worker 10A. As one example, CAS 68F may use machine learning to classify the sensor data into various tasks performed workers 10. For example, CAS 68F may apply one or more models 74B to the activity data (e.g., stored in worker data 74C) associated with target worker 10A to determine that the motion data associated with worker 10A at a particular time indicates worker 10A was lifting heavy equipment at the particular time. As used throughout this disclosure, a "time" refers to a period of time, such as a minute, several minutes, an hour, etc., rather than an instant in time.

According to one example, CAS 68F determines one or more tasks performed by one or more workers 10A based on data from sensing stations 21. For example, sensing stations 21 may include camera and/or microphone. In such examples, sensing stations 21 may detect sounds produced by one or more articles of equipment, and CAS 68F may determine which tasks workers 10 are performing by analyzing audio data from sensing stations 21 to determine what equipment workers 10A are utilizing, which may indicate which tasks workers 10 are performing. As another example, sensing stations 21 may use cameras to monitor movements of workers 10 within a work environment 8B and may use image recognition techniques and/or motion tracking techniques to determine what tasks workers 10A are performing. For instance, CAS 68F may utilize vision methods of feature extraction (e.g., SIFT, SURF, Gabor filters, LBP, GIST, etc.) paired with classifiers (e.g., random forest, SVM, etc.) to identify tasks performed by workers 10.

In some examples, CAS 68F determines a task performed by worker 10A based on equipment (e.g., PPE 13) usage, location data, or both. For example, CAS 68F may receive an indication that PPE 13A associated with worker 10A was turned on, such that CAS 68F and may determine that worker 10A was performing a particular task associated with PPE 13A. As another example, CAS 68F may receive an indication that an article of equipment was operating at a particular time and determine, based on location data (e.g., GPS coordinates) corresponding to worker 10A, that the location of worker 10A corresponds to the location of the particular article of equipment. In response, CAS 68F may determine that worker 10A was performing a task associated with the particular article of equipment.

CAS 68F may determine, for each worker in a cluster of workers 10 that includes worker 10A, a performance metric associated with a particular task. CAS 68F may determine the performance metric based at least in part on data from motion sensors 23, physiological sensors 22, sensing stations 21, PPE 13 (e.g., including equipment sensors 26), beacons 17, or a combination therein. In some examples, the performance metric indicates overall time spent during certain activities, continuous time spent on one activity, a duty cycle, a pattern of breaks or chain of activities, among others.

In some examples, the performance metric indicates a quantity of time utilized by worker 10A to perform a task. For example, CAS 68F may receive an indication of a location of worker 10A (e.g., GPS coordinates from a GPS enabled device worn by worker 10A), an indication of PPE 13 worn by worker 10A, and determine whether worker 10A is utilizing proper PPE (e.g., given the location), the amount of time that each worker spends at that location, or both. As another example, where a performance metric indicates a quantity of time that target worker 10A utilizes to perform a task and worker 10A utilizes one or more articles of PPE 13 to perform the task, CAS 68F may receive data from PPE 13A (e.g., a SCBA tank) indicating a quantity of time that PPE 13A was turned on or an amount of PPE resources (e.g., battery life, oxygen, etc.) utilized. In this way, CAS 68F may determine the quantity of time that target worker 10A was working. Thus, for example, given a time period, CAS 68F may compute the percentage of time a worker spent on each task.

In some examples, activity data received by CAS 68F may indicate a worker was inactive when he or she may have been active. For example, the activity data received by CAS 68F may indicate a 1-minute period of "inactivity" between two 10 minute periods of an activity, which may indicate the worker took a 1 minute break, or may indicate a gap in the activity data for a minute even though the worker was working for this 21 minute period. Thus, in some examples, CAS 68F may apply filtering or smoothing methods to the activity data to determine a performance metric.

In some scenarios, CAS 68F determines the performance metric based at least in part on data from a plurality of sources. For example, CAS 68F may determine the quantity of time that worker 10A is working based on data from motion sensor 23A and PPE 13A. For instance, CAS 68F may determine when worker 10A was active (e.g., physically moving) and PPE 13 was turned on to determine the amount of time worker 10A was performing a task. In this way, in some examples, CAS 68F may more accurately determine the performance metric, for example, which may reduce errors if data from one source is not indicative of worker performance (e.g. inadvertently leaving PPE 13 turned on during a lunch break may negatively skew worker efficiency). For example, CAS 68F may more accurately determine the duty cycle of worker 10A.

In some examples, a safety event corresponds to a type of activity performed by a worker and performance with respect to safety events corresponds to a frequency with which a worker performs a particular type of activity. For example, certain safety events, such as overuse injuries, may correspond to a frequency with which an activity is performed. Thus, in some examples, CAS 68F determines performance of a target entity with respect to overuse injuries corresponding to frequently performed activities. Similarly, CAS 68F may determine the performance of a cluster that includes the target entity with respect to safety events corresponding to a frequency of performing a particular type of activity.

CAS 68F may determine a performance metric for one or more work environments. In some examples, performance of individual workers 10A may be aggregated to determine performance of all workers 10 at a work environment. For example, CAS 68F may determine a quantity of time utilized by workers at different work environments to perform a given task, such as install an article of equipment or decontaminate a work environment, among others.

Responsive to determining the performance metric for a target entity, notification service 68E may output an indication of a difference between performance by the target entity and the performance of the cluster of entities that includes the target entity. For example, as further illustrated in FIG. 5, notification service 68E outputs an indication of a graphical user interface (e.g., for display by one of computing devices 60) that indicates the performance of the target entity (e.g., worker 10A or work environment 8B) and the performance of a cluster of entities that includes the target entity. In some examples, the indication of the graphical user interface includes an indication of the performance of each entity in the cluster of entities. In some instances, the graphical user interface includes an indication of safety performance, task performance, or both. For instance, the graphical user interface may include a graphical indication of a difference between a safety metric for the target entity and a safety metric that includes the target entity, a graphical indication of a difference between a performance metric for the target entity and a performance metric that includes the target entity, or both.

CAS 68F may, in some examples, determine whether the performance metric for a target entity satisfies a threshold for the performance metric. For example, in scenarios where the performance metric indicates a task efficiency, CAS 68F may determine whether a task efficiency for worker 10A satisfies a threshold task efficiency. In one example, the threshold for the performance metric may be predefined. In some examples, the threshold for the performance metric is based on a performance metric for the cluster of entities that includes the target entity. For example, CAS 68F may determine whether a difference between performance of a target entity relative to performance of the cluster of entities that include the target entity satisfies a threshold difference (e.g., one standard deviation). For example, CAS 68F may determine whether a difference between the number of safety events experienced by work environment 8B and the average number of safety events experienced by the cluster of work environments that includes work environment 8B is greater than a threshold number of safety events. Similarly, CAS 68F may determine whether a difference between efficiency of target worker 10A relative to efficiency of the cluster of workers including target worker 10A is greater than a threshold efficiency.

In response to determining that the performance metric for a target entity satisfies a threshold for the performance metric, or that the difference between performance of a target entity relative to one to performance of the cluster of entities that include the target entity satisfies a threshold difference, CAS 68F may determine one or more factors that contribute to the difference. For example, CAS 68F may determine one or more activities to improve the performance metric of the target entity.

CAS 68F may determine one or more activities likely to improve the performance metric for the target entity based on application of at least one performance model 74B. In some examples, performance models 74B may include one or more models trained using historical activity data for workers 10. For example, CAS 68F may determine based on performance models 74B, a pattern of worker movements that enable workers at work environment 8B to perform tasks faster than workers at other work environments. CAS 68F can discern the task being performed based on motion sensing and/or location, then record subsequent sensor data as being associated with the discerned task. Or, the system can store all motion sensor data as time stamped information of each worker, and store time stamped data from all other sensors (body worn, tool, environmental, or cloud based) to be later analyzed. In some cases, performance of a worker may be determined from sensor data. In some cases, performance of a worker may be determined by automated data mining of other records, such as performance reviews, injury records, safety violation records, etc. In some cases, cloud-based environmental sensor data may originate from trusted IoT sensors and be stored to work environment data 74A.

CAS 68F may compare performance of a single worker 10 against that same worker over time, with only a single person in the improvement cycle, encouraging motions and actions that correlate with the most productive periods. CAS 68F may alternatively or additionally compare the single worker 10 to other workers within the same work environment 8, to other workers across the workers 10 company, and/or across multiple companies.

As another example, CAS 68F may determine activities that contribute to safety events corresponding to a frequency with which workers perform a particular type of activity. For example, CAS 68F may determine movements that contribute to overuse injuries caused by frequently performing a particular type of activity (e.g. lifting items). CAS may determine movements that contribute to overuse injuries experienced by a particular worker 10A, for example, by tracking the movements of worker 10A over time and applying one or more performance models 74B to the movements. CAS 68F may identify, based on applying the performance models 74B to the movements, alternative movements likely to reduce safety events (e.g., overuse injuries) corresponding to a frequency with which worker 10A performs a particular type of activity.

In another example, CAS 68F may analyze the activity data associated with work environments 8 to identify activities that cause work environment 8B to experience more than the average number of safety events and identify corrective activities that may reduce the number of safety events. As yet another example, CAS 68F may determine one or more activities that enable worker 10A to be more productive at the particular task relative to similar workers.

Responsive to determining one or more activities likely to increase performance of the target entity, notification service 68E may output an indication of the one or more activities. For example, notification service 68E may output, for display by one of computing device 60, a graphical user interface indicating the performance metric for the target entity and the one or more activities likely to improve the performance metric for target entity.

In some examples, CAS 68F may update one or more models 74B based on the differences in performance. For example, in response to adding a new task to models 74B, CAS 68F may update models 74B to estimate the amount of time to perform the new task based on the time to perform other similar tasks.

In some examples, rather than comparing a target entity to a cluster of similar entities, CAS 68F may compare current performance of a particular entity to historical performance of that entity. For example, CAS 68F may determine a difference between performance of worker 10A compared to the performance of worker 10A over time, and may determine operational changes that may enable worker 10A to improve performance. For example, CAS 68F may identify periods of time when worker 10A was most productive, determine activities that contributed to those periods of higher productivity, and output an indication of those activities to coach worker 10A. As described above, performance of the worker may be based on sensor data.

Figure 3:
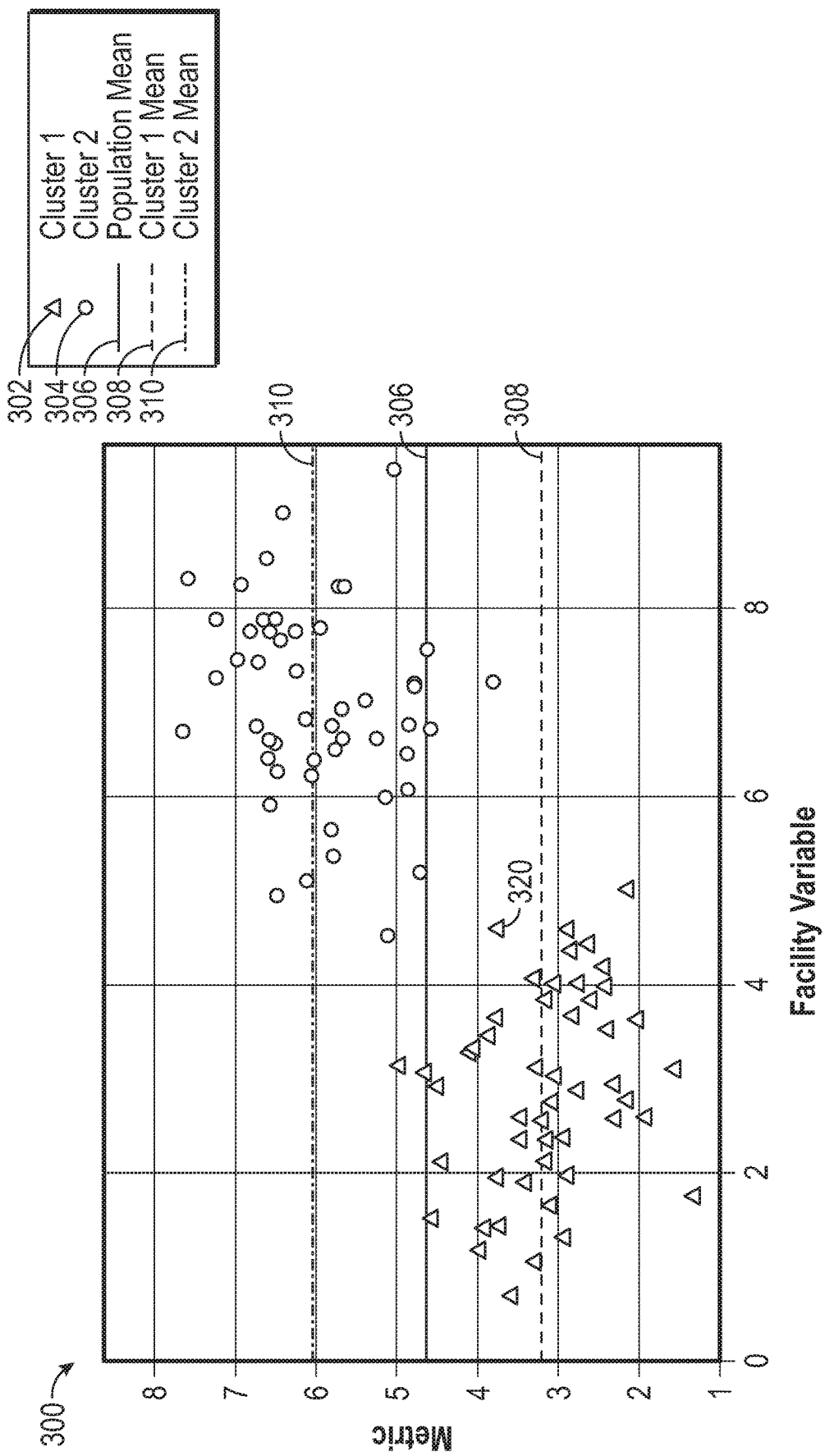
FIG. 3 illustrates an example user interface of the worker safety management system, according to techniques of this disclosure.

FIG. 3 illustrates an example graphical user interface for a worker safety management system, according to techniques of this disclosure. For example, SMS 6 of FIGS. 1 and 2 may output an indication of a difference between performance by a target entity (e.g., worker or work environment) and performance by a cluster of entities that includes the target entity. In other words, SMS 6 may output an indication of the performance of the target entity relative to the performance of a cluster of similar entities.

SMS 6 may output, for display, a graphical user interface 300 indicative of one or more clusters of entities. In the example of FIG. 3, graphical user interface 300 includes graphical elements (e.g., icons) indicative of a first cluster of entities 302 and graphical elements indicative of a second cluster of entities 304. In some examples, cluster 302 includes a target entity 320. SMS 6 may output a graphical indication of the performance of each entity in cluster 302. In the example of FIG. 3, graphical user interface 300 includes graphical elements indicating the performance of each entity in cluster 302, including a graphical element indicating the performance of target entity 320.

Graphical user interface 300 displays a graph having a vertical axis representing a metric for performance with respect to safety events (e.g., number of accidents) and a horizontal axis representing a descriptive variable of the facility (e.g., number of workers, number of jobs, length of jobs, etc.). The graph includes various indications of performance with respect to safety events by different groups of entities and each entity.

Graphical user interface 300 includes an indication of a difference between the performance of target entity 320 and the performance of cluster 302. In some examples, graphical user interface 300 includes a graphical element 308 (e.g., a line) indicating the performance of the first cluster of entities and a graphical element 310 indicating the performance of the second cluster of entities. For example, graphical indications 308, 310 may indicate the average (e.g., mean, median, or mode) performance of the first cluster 302 and second cluster 304, respectively. In some examples, the position of the graphical element representing the performance of target entity 302 relative to the position of a graphical element 308 representing the performance of cluster 308 indicates a difference between performance of target entity 320 and performance of cluster 302.

The data displayed at graphical user interface 300 illustrates a technical advantage of this disclosure. Each of the points (represented by triangles identified as members of cluster 302 and circles identified as members of cluster 304) represent entities (in this case, different facilities). Most points of cluster 302 lie below the metric mean of all points (indicated by graphical element 306), while most points of cluster 304 lie above the metric mean of all points. However, many points of cluster 302, such as target entity 320, lie above the metric mean of cluster 302 indicated by graphical element 308 but below the metric indicated by graphical element 306. Such points represent facilities that have a metric below the average of all facilities but greater than its group average. Target facility 320, e.g., performs well with respect to the safety metric in comparison to all facilities, but when compared to facilities in its cluster 302 is below-average (i.e., has a higher metric). This above assumes that the metric indicated in graphical user interface 300 is a negative metric (e.g., number of accidents for the facility).

In some examples, the indication of a difference between performance by a target entity 320 of the entities with respect to safety events and performance by the cluster 302 that includes the target entity 320 with respect to safety events may not be a graph as in graphical user interface 300, but the indication may instead be computed and output as a difference between the value for the target entity 320 and a value for (e.g., a mean of all entities that are members of) the cluster 302, a rank of the target entity 320 and other entities of the cluster 302, an indication that the value for the target entity 320 is greater/lesser, higher/lower, or other superlative degree of comparison than the value for cluster 302, or other indication.

FIG. 4 illustrates an example user interface of the worker safety management system, according to techniques of this disclosure. FIG. 4 is described with reference to worker safety management system 6 as described in FIGS. 1 and 2.

SMS 6 may output a graphical user interface 400 representing an entity performance query. In the example of FIG. 4, graphical user interface 400 includes a graphical element 402 enabling users 20, 24 of computing devices 16, 18 to identify a target entity, graphical element 404 enabling users 20, 24 to identify a time period, and graphical elements 406-412 enabling users 20, 24 to select one or more performance metrics.

SMS 6 may receive user input entering data at graphical elements 402, 404 and selecting one or more graphical elements 406-412. In some examples, SMS 6 may determine a cluster of entities that includes the target entity in response to receiving the user input, as described in this disclosure. Responsive to receiving the user input, SMS 6 may determine the performance of the target entity, performance of other entities in the cluster, and determine performance of the cluster, and output an indication of the performance, as further illustrated in FIG. 5.

Figure 5:
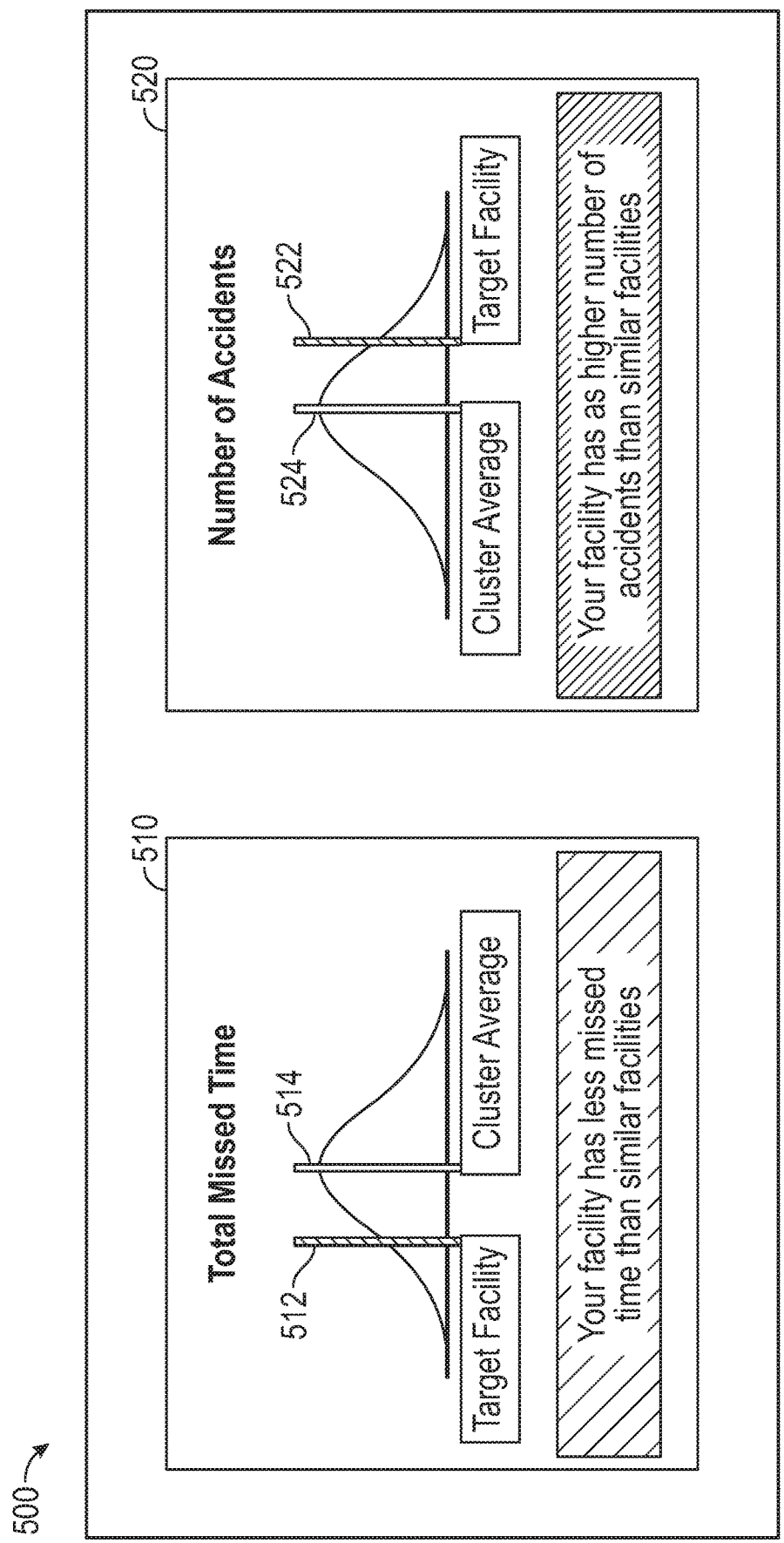
FIG. 5 illustrates an example user interface of the worker safety management system, according to techniques of this disclosure.

FIG. 5 illustrates an example user interface of the worker safety management system, according to techniques of this disclosure. FIG. 5 is described with reference to worker safety management system 6 as described in FIGS. 1 and 2.

SMS 6 may output an indication of a difference between performance by a target entity and performance by the cluster that includes the target entity. In other words, SMS 6 may output an indication of a difference between performance of the target entity relative to the performance of a cluster of entities similar to the target entity.

SMS 6 may output, for display, a graphical user interface indicative of a difference between performance of the target entity relative to a cluster of similar entities with respect to one or more safety metrics, a difference between of the target entity relative to a cluster of similar entities with respect to performance metrics, or both. For example, as illustrated in FIG. 5, graphical user interface 500 includes a graphical element 510 (e.g., a chart) indicative of a difference between of the target entity relative to a cluster of similar entities with respect to a performance metric, such as total missed time. Graphical element 510 includes a graphical element 512 indicating performance (e.g., amount of missed time) of a target entity and a graphical element 514 indicating performance of the cluster of entities that includes the target entity. For instance, graphical element 514 may indicate the average performance of the cluster (e.g., average amount of missed time).

Similarly, as illustrated in the example of FIG. 5, graphical user interface 500 includes a graphical element 520 (e.g., a chart) indicative of a difference between performance of the target entity relative to a cluster of similar entities with respect a safety metric, such as number of accidents. Graphical element 520 includes a graphical element 522 indicating performance (e.g., number of accidents) of a target entity and a graphical element 524 indicating performance of the cluster of entities that includes the target entity. For instance, graphical element 524 may indicate the average performance (e.g., average number of accidents) of the cluster.

Figure 6:
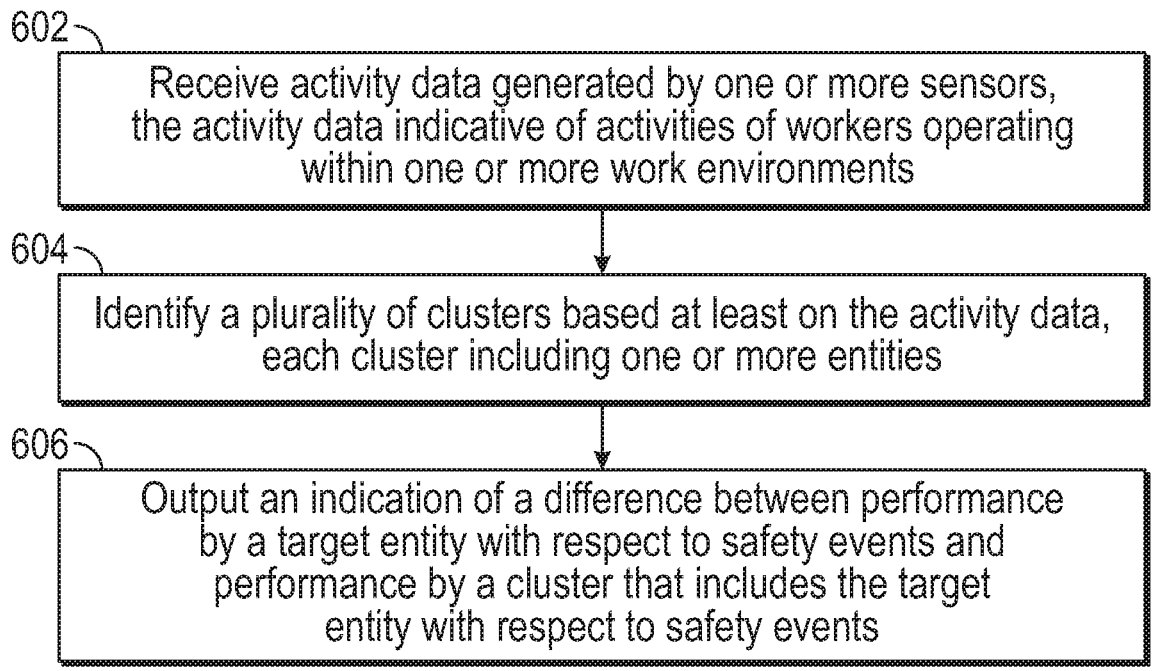
FIG. 6 is a flowchart illustrating an example mode of operation for a worker safety management system, according to techniques described in this disclosure.

FIG. 6 is a flowchart illustrating an example mode of operation for a worker safety management system, according to techniques described in this disclosure. FIG. 6 is described with reference to worker safety management system 6 as described in FIGS. 1 and 2.

SMS 6 may receive activity data generated by one or more sensors, where the activity data is indicative of activities of one or more workers operating within one or more work environments (602). For example, SMS 6 may receive activity data from the one or more sensors in approximately real-time, and/or may receive activity data from one or more data repositories such as work environment data 74A or worker data 74C. The one or more sensors may be included within personal protective equipment (PPE) devices worn by the one or more workers.

SMS 6 may identify, based at least in part on activity data indicative of activities of workers 10 operating within work environments 8, a plurality of clusters that each include one or more entities (604). Each entity may be associated with one or more workers. For example, an entity may refer to a worker of workers 10 or a work environment of work environments 8, where each work environment is associated with one or more workers 10. To identify the plurality of clusters, SMS 6 may generate, from the entity data, respective d-dimensional vectors for the entities, wherein each of the d-dimensional vectors has a corresponding value for each dimension of the d dimensions that indicates a value in the dimension for the corresponding entity. SMS 6 may then process the d-dimensional vectors using a clustering algorithm to identify a plurality of clusters of the one or more entities, wherein each entity of the entities is associated with one or more workers.

SMS 6 may identify the plurality of clusters based on one or more performance models 74B. SMS 6 may train performance models 74B utilizing a machine learning clustering algorithm or a similarity algorithm. In some examples, SMS 6 may train performance models 74B based on work environment data 74A, worker data 74C, or both. Further, SMS 6 may apply performance models 74B to activity data (e.g., data stored with work environment data 74A, worker data 74C, or both) to determine clusters of entities that are similar to one another.

In some examples, SMS 6 outputs an indication of a difference between performance by a target entity and performance by the cluster that includes the target entity (606). In some examples, the performance of the target entity and performance of the cluster that includes the target entity is associated with performance with respect to safety events. In other words, in some examples, SMS 6 outputs an indication of a different in safety performance of the target entity relative to the safety performance of the cluster. For example, SMS 6 may output, for display, a graphical user interface that indicates the performance of a target entity with respect to safety and indicates the performance (e.g., average performance) of a cluster of entities that includes the target entity, such that the graphical further indicates the difference between the performance of the target entity and the performance of the cluster of similar entities. For example, the graphical user interface may indicate the number of safety events experienced by each respective entity in the cluster (e.g., including the target entity) and an average number of safety events experienced by the entities in the cluster.

Figure 7:
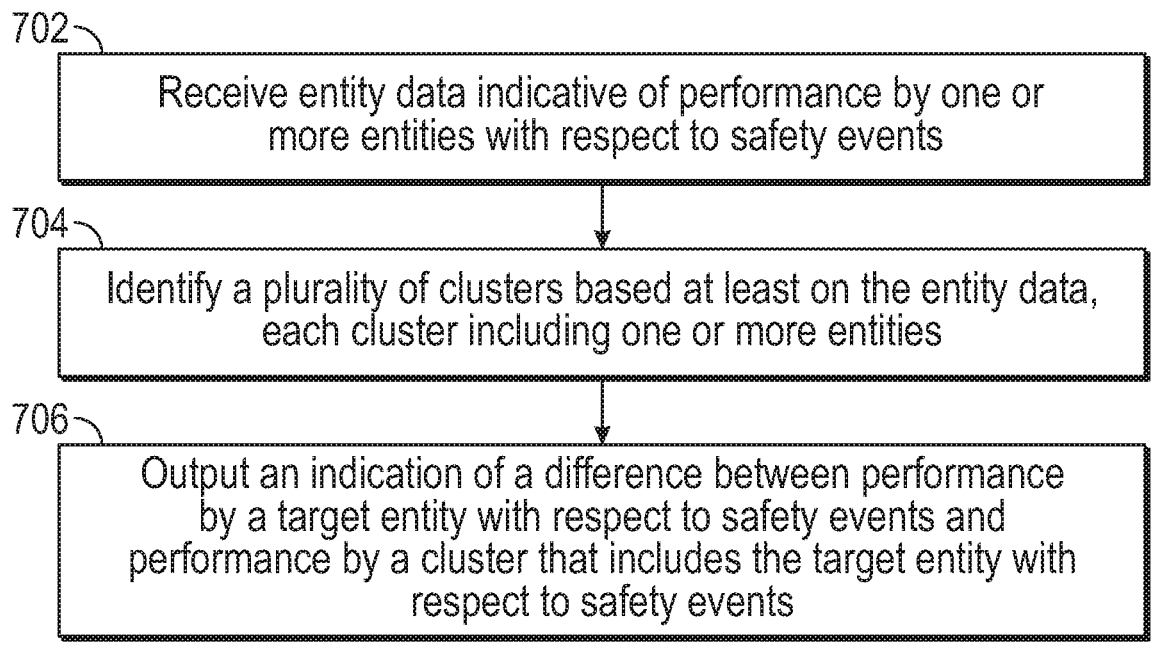
FIG. 7 is a flowchart illustrating an example mode of operation for a worker safety management system, according to techniques described in this disclosure.

FIG. 7 is a flowchart illustrating an example mode of operation for a worker safety management system, according to techniques described in this disclosure. FIG. 7 is described with reference to worker safety management system 6 as described in FIGS. 1 and 2.

SMS 6 may receive entity data indicative of performance of one or more entities with respect to safety events (702). For example, SMS 6 may receive entity data from one or more data repositories such as work environment data 74A or worker data 74C. In some examples, entity data includes worker data 74C, such as activity data generated by one or more sensors, or biographical data associated with workers 10. The one or more sensors may be included within personal protective equipment (PPE) devices worn by the one or more workers. Biographical data may include demographic data, worker type data, training data, safety data (e.g., number of injuries, safety violations, etc.). Work environment data 74A may include safety event statistics, work environment characteristics (e.g., size, location, type of work environment, type of work performed, etc.). In some examples work environment data 74A includes information includes data indicative of equipment at a work environment, number of workers, insurance data, etc.

Work environment data 74A and worker data 74C may represent examples instances of work environment data 29A and worker data 29B, respectively, of FIG. 1. Work environment data 74A and worker data 74C may include unstructured data, structured data, and/or structured data generated from unstructured data.

SMS 6 may identify, based at least in part on entity data, a plurality of clusters that each include one or more entities (704). Each entity may be associated with one or more workers. For example, an entity may refer to a worker of workers 10 or a work environment of work environments 8, where each work environment is associated with one or more workers 10. To identify the plurality of clusters, SMS 6 may generate, from the entity data, respective d-dimensional vectors for the entities, wherein each of the d-dimensional vectors has a corresponding value for each dimension of the d dimensions that indicates a value in the dimension for the corresponding entity. SMS 6 may then process the d-dimensional vectors using a clustering algorithm to identify a plurality of clusters of the one or more entities, wherein each entity of the entities is associated with one or more workers.

SMS 6 may identify the plurality of clusters based on one or more performance models 74B. SMS 6 may train performance models 74B utilizing a machine learning clustering algorithm or a similarity algorithm. In some examples, SMS 6 may train performance models 74B based on entity data such as work environment data 74A, worker data 74C, or both. Further, SMS 6 may apply performance models 74B to entity data (e.g., data stored with work environment data 74A, worker data 74C, or both) to determine clusters of entities that are similar to one another.

In some examples, SMS 6 outputs an indication of a difference between performance by a target entity with respect to safety events and performance by the cluster that includes the target entity with respect to safety events (706). In other words, in some examples, SMS 6 outputs an indication of a different in safety performance of the target entity relative to the safety performance of the cluster. For example, SMS 6 may output, for display, a graphical user interface that indicates the performance of a target entity with respect to safety and indicates the performance (e.g., average performance) of a cluster of entities that includes the target entity, such that the graphical further indicates the difference between the performance of the target entity and the performance of the cluster of similar entities. For example, the graphical user interface may indicate the number of injuries experienced by each respective entity in the cluster (e.g., including the target entity) and an average number of injuries experienced by the entities in the cluster.

The following numbered examples may illustrate one or more aspects of the disclosure:

Example 1. A method comprising: identifying, by a computing system, based at least on activity data that is generated by one or more sensors and is indicative of activities of workers operating within one or more work environments, a plurality of clusters of one or more entities, wherein each entity of the entities is associated with one or more workers; and outputting, by the computing system, an indication of a difference between performance by a target entity with respect to safety events and performance by the cluster that includes the target entity with respect to safety events.

Example 2. The method of example 1, wherein the activity data comprises one or more of PPE usage data and physiological data for the workers.

Example 3. The method of example 1, further comprising: receiving, by the computing system, entity data for each of the entities, the entity data indicative of at least one of characteristics of the workers and characteristics of work environments that correspond to the entities; and identifying, by the computing system, based at least on the entity data, the plurality of clusters of one or more entities.

Example 4. The method of example 3, wherein the entity data comprises one or more of demographic data for the workers and safety events statistics of the work environments.

Example 5. The method of example 3, further comprising: generating, by the computing system, from the activity data and entity data, respective d-dimensional vectors for the entities, wherein each of the d-dimensional vectors has a corresponding value for each dimension of the d dimensions that indicates a value in the dimension for the corresponding entity; processing, by the computing system, the d-dimensional vectors using a clustering algorithm to identify the plurality of clusters of one or more entities.

Example 6. The method of example 1, wherein the activity data comprises one or more of time spent at activities by the workers, continuous time spent by workers per activity, duty cycles by workers, and activity patterns.

Example 7. The method of example 1, wherein each entity of the entities is a worker of the one or more workers.

Example 8. The method of example 1, wherein each entity of the entities is a work environment of the one or more work environments in which the one or more workers associated with the entity are operating.

Example 9. The method of example 1, wherein the activity data is indicative of one or more safety metrics for the workers, further comprising: computing, by the computing system, based on the plurality of clusters and the one or more entities, a safety metric for the target entity and a safety metric for the cluster that includes the target entity, and wherein outputting the indication of the difference comprises outputting an indication of a difference between the safety metric for the target entity and the safety metric for the cluster that includes the target entity.

Example 10. The method of example 1, wherein the activity data is indicative of one or more performance metrics for the workers, the method further comprising:
computing, by the computing system, based on the plurality of clusters and the one or more entities, a performance metric for the target entity and a performance metric for the cluster that includes the target entity, and wherein outputting the indication of the difference comprises outputting an indication of a difference between the performance metric for the target entity and the performance metric for the cluster that includes the target entity.

Example 11. The method of example 1, wherein the activity data is indicative of one or more performance metrics for the workers, the method further comprising:
determining, by the computing system, whether a performance metric of the target entity satisfies a threshold for the performance metric; and in response to determining that the performance metric does not satisfy the threshold for the performance metric: determining, by the computing system, based on at least on an activity model trained using historical activity data for workers, one or more activities likely to improve the performance metric of the target entity; and outputting, by the computing system an indication of the one or more activities.

Example 12. The method of example 1, wherein the safety events correspond to a type of activity performed by a worker, wherein the performance by the target entity with respect to safety events corresponds to a frequency with which one or more workers associated with the target entity perform of the type of activity, and wherein performance by the cluster that includes the target entity with respect to safety events corresponds to a frequency with which one or more workers associated with the one or more entities of the cluster that includes the target entity perform of the type of activity.

Example 13. The method of example 1, wherein at least one of the PPE devices is a communication hub that includes the computing device.

Example 14. A method comprising: receiving, by a computing device, entity data indicative of performance by one or more entities with respect to safety events; identifying, by the computing device, based at least on the entity data, a plurality of clusters of the one or more entities, wherein each entity of the entities is associated with one or more workers; and outputting, by the computing device an indication of a difference between performance by a target entity with respect to safety events and performance by the cluster that includes the target entity with respect to safety events.

Example 15. The method of example 14, wherein each entity of the entities is a work environment of the one or more work environments in which the one or more workers associated with the entity are operating, and wherein the entity data is indicative of characteristics of the work environments and safety events statistics of the work environments.

Example 16. The method of example 14, wherein each entity of the entities is a worker of the one or more workers, and wherein the entity data is indicative of characteristics of the workers and safety events statistics of the workers.

Example 17. The method of example 14, further comprising: generating, by the computing device, from the entity data, respective d-dimensional vectors for the entities, wherein each of the d-dimensional vectors has a corresponding value for each dimension of the d dimensions that indicates a value in the dimension for the corresponding entity; and processing, by the computing device, the d-dimensional vectors using a clustering algorithm to identify the plurality of clusters of one or more entities.

Example 18. The method of example 14, wherein the performance by the cluster that includes the target entity with respect to safety events is based on an average performance of the one or more entities of the cluster that includes the target entity.

Although the methods and systems of the present disclosure have been described with reference to specific exemplary embodiments, those of ordinary skill in the art will readily appreciate that changes and modifications may be made thereto without departing from the spirit and scope of the present disclosure.

In the present detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above or on top of those other elements.

As used herein, when an element, component, or layer for example is described as forming a "coincident interface" with, or being "on," "connected to," "coupled with," "stacked on" or "in contact with" another element, component, or layer, it can be directly on, directly connected to, directly coupled with, directly stacked on, in direct contact with, or intervening elements, components or layers may be on, connected, coupled or in contact with the particular element, component, or layer, for example. When an element, component, or layer for example is referred to as being "directly on," "directly connected to," "directly coupled with," or "directly in contact with" another element, there are no intervening elements, components or layers for example. The techniques of this disclosure may be implemented in a wide variety of computer devices, such as servers, laptop computers, desktop computers, notebook computers, tablet computers, hand-held computers, smart phones, and the like. Any components, modules or units have been described to emphasize functional aspects and do not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Additionally, although a number of distinct modules have been described throughout this description, many of which perform unique functions, all the functions of all of the modules may be combined into a single module, or even split into further additional modules. The modules described herein are only exemplary and have been described as such for better ease of understanding.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

What is claimed is:

1. A system comprising: one or more personal protective equipment (PPE) devices each configured to be worn by a worker, the PPE devices each including one or more sensors that provide (i) activity data indicative of activities of workers operating within one or more work environments and (ii) location data indicative of locations of the workers within the one or more work environments; a computing device, the computing device configured to: identify, based at least on the activity data and the location data, a plurality of clusters of one or more entities, wherein each entity of the one or more entities is associated with one or more of the workers, and wherein the computing device is configured to identify the plurality of clusters of the one or more entities at least by being configured to: identify, based at least on the activity data and the location data, a first cluster that includes at least a target entity; and identify, based at least on the activity data and the location data, a second cluster that is different from the first cluster; and responsive to determining a difference between performance by the target entity with respect to safety events and performance by the first cluster with respect to the safety events, output, via wireless communication and to one or more of the PPE devices configured to be worn by one or more of the workers associated with the target entity, an alert to indicate the difference, wherein the alert indicates at least one anomalous occurrence of a safety event associated with the target entity relative to the first cluster, and wherein the one or more of the PPE devices each includes an output device that is configured to output the alert to the one or more workers associated with the target entity.

2. The system of claim 1, wherein the activity data comprises one or more of PPE usage data and physiological data for the workers.

3. The system of claim 1, wherein the computing device is further configured to: receive entity data for each of the entities, the entity data indicative of at least one of characteristics of the workers and characteristics of work environments that correspond to the entities; and identify, further based at least on the entity data, the plurality of clusters of one or more entities.

4. The system of claim 3, wherein the entity data comprises one or more of demographic data for the workers and safety events statistics of the work environments.

5. The system of claim 3, wherein the computing device is further configured to: generate, from the activity data and the entity data, respective d-dimensional vectors for the entities, wherein each of the d-dimensional vectors has a corresponding value for each dimension of the d dimensions that indicates a value in the dimension for the corresponding entity; and process the d-dimensional vectors using a clustering algorithm to identify the plurality of clusters of one or more entities.

6. The system of claim 1, wherein the activity data comprises one or more of time spent at activities by the workers, continuous time spent by the workers per activity, duty cycles by the workers, and activity patterns.

7. The system of claim 1, wherein each entity of the entities is a respective worker of the one or more workers.

8. The system of claim 1, wherein each entity of the entities is a work environment of the one or more work environments in which the one or more workers associated with the entity are operating.

9. The system of claim 1, wherein the activity data is indicative of one or more safety metrics for the workers, wherein the computing device is configured to compute, based on the plurality of clusters and the one or more entities, a safety metric for the target entity and a safety metric for the cluster that includes the target entity, and wherein to output the alert, the computing device is configured to output the alert to indicate a difference between the safety metric for the target entity and the safety metric for the cluster that includes the target entity.

10. The system of claim 1, wherein the activity data is indicative of one or more performance metrics for the workers, wherein the computing device is configured to compute, based on the plurality of clusters and the one or more entities, a performance metric for the target entity and a performance metric for the cluster that includes the target entity, and wherein to output the alert, the computing device is configured to output the alert to indicate a difference between the performance metric for the target entity and the performance metric for the cluster that includes the target entity.

11. The system of claim 1, wherein the activity data is indicative of one or more performance metrics for the workers, and wherein the computing device is further configured to determine whether a performance metric of the target entity satisfies a threshold for the performance metric, wherein the computing device is further configured to, in response to determining that the performance metric does not satisfy the threshold for the performance metric: determine, based on at least on an activity model trained using historical activity data for workers, one or more activities likely to improve the performance metric of the target entity; and output an indication of the one or more activities.

12. The system of claim 1, wherein the safety events correspond to a type of activity performed by a respective worker of the one or more workers, wherein the performance by the target entity with respect to safety events corresponds to a frequency with which the one or more workers associated with the target entity perform of the type of activity, and wherein performance by the cluster that includes the target entity with respect to safety events corresponds to a frequency with which one or more workers associated with the one or more entities of the cluster that includes the target entity perform of the type of activity.

13. The system of claim 1, wherein at least one of the PPE devices is a communication hub that includes the computing device.

14. A computing device comprising: at least one processor; and a memory comprising instructions that, when executed, cause the at least one processor to: receive, from one or more personal protective equipment (PPE) devices within one or more work environments, entity data indicative of performance by one or more entities with respect to safety events; receive, from the one or more PPE devices, location data indicative of locations of workers within the one or more work environments; generate, from the entity data, respective d-dimensional vectors for the one or more entities, wherein each of the d-dimensional vectors has a corresponding value for each dimension of the d dimensions that indicates a value in the dimension for the corresponding entity; process the d-dimensional vectors using a clustering algorithm to identify a plurality of clusters of the one or more entities, wherein each entity of the one or more entities is associated with one or more of the workers, and wherein the instructions cause the at least one processor to identify the plurality of clusters of the one or more entities at least by causing the at least one processor to: identify, based at least on the entity data and the location data, a first cluster that includes at least a target entity; and identify, based at least on the entity data and the location data, a second cluster that is different from the first cluster; and responsive to determining a difference between performance by the target entity with respect to safety events and performance by the first cluster with respect to the safety events, output, via wireless communication and to at least one PPE device configured to be worn by one or more of the workers associated with the target entity, an alert to indicate the difference, wherein the alert indicates at least one anomalous occurrence of a safety event associated with the target entity relative to the first cluster, and wherein the at least one PPE device each includes an output device that is configured to output the alert to the one or more workers associated with the target entity.

15. The computing device of claim 14, wherein each entity of the entities is a work environment in which the one or more workers associated with the respective entity are operating, and wherein the entity data is indicative of characteristics of the work environments and safety events statistics of the work environments.

16. The computing device of claim 14, wherein each entity of the entities is a worker of the one or more workers associated with the respective entity, and wherein the entity data is indicative of characteristics of the workers and safety events statistics of the workers.

17. The computing device of claim 14, wherein the performance by the first cluster that includes the target entity with respect to safety events is based on an average performance of one or more entities of the first cluster that includes the target entity.

18. A computing device comprising: at least one processor; and a memory comprising instructions that, when executed, cause the at least one processor to: identify, based at least on activity data and location data provided by one or more sensors included in one or more personal protective equipment (PPE) devices each configured to be worn by a worker, a plurality of clusters of one or more entities, wherein each entity of the one or more entities is associated with one or more of a plurality of workers within one or more work environments, wherein the activity data is indicative of activities of the workers operating within the one or more work environments, wherein the location data is indicative of locations of the workers within the one or more work environments, and wherein the instructions cause the at least one processor to identify the plurality of clusters of the one or more entities at least by causing the at least one processor to: identify, based at least on the activity data and the location data, a first cluster that includes at least a target entity; and identify, based at least on the activity data and the location data, a second cluster that is different from the first cluster; and responsive to determining a difference between performance by the target entity with respect to safety events and performance by the first cluster with respect to the safety events, output, via wireless communication and to one or more of the PPE devices configured to be worn by one or more of the workers associated with the target entity, an alert to indicate the difference, wherein the alert indicates at least one anomalous occurrence of a safety event associated with the target entity relative to the first cluster, and wherein the one or more of the PPE devices each includes an output device that is configured to output the alert to the one or more workers associated with the target entity.

19. The computing device of claim 18, wherein the activity data comprises one or more of PPE usage data and physiological data for the workers.

20. The computing device of claim 18, wherein execution of the instructions further cause the at least one processor to: receive entity data for each of the entities, the entity data indicative of at least one of characteristics of the workers and characteristics of work environments that correspond to the entities; and identify, further based at least on the entity data, the plurality of clusters of one or more entities.

21. The computing device of claim 20, wherein the entity data comprises one or more of demographic data for the workers and safety events statistics of the work environments.

22. The computing device of claim 21, wherein execution of the instructions further cause the at least one processor to: generate, from the activity data and the entity data, respective d-dimensional vectors for the entities, wherein each of the d-dimensional vectors has a corresponding value for each dimension of the d dimensions that indicates a value in the dimension for the corresponding entity; and process the d-dimensional vectors using a clustering algorithm to identify the plurality of clusters of one or more entities.

23. The computing device of claim 18, wherein the activity data comprises one or more of time spent at activities by the workers, continuous time spent by the workers per activity, duty cycles by the workers, and activity patterns.

24. The computing device of claim 18, wherein each entity of the entities is a respective worker of the one or more workers.

25. The computing device of claim 18, wherein each entity of the entities is a work environment of the one or more work environments in which the one or more workers associated with the entity are operating.

26. The computing device of claim 18, wherein the activity data is indicative of one or more safety metrics for the workers, wherein execution of the instructions further cause the at least one processor to compute, based on the plurality of clusters and the one or more entities, a safety metric for the target entity and a safety metric for the cluster that includes the target entity, and wherein execution of the instructions further cause the at least one processor to output the alert—by at least causing the at least one processor to output the alert to indicate a difference between the safety metric for the target entity and the safety metric for the cluster that includes the target entity.

27. The computing device of claim 18, wherein the activity data is indicative of one or more performance metrics for the workers, wherein execution of the instructions further cause the at least one processor to compute, based on the plurality of clusters and the one or more entities, a performance metric for the target entity and a performance metric for the cluster that includes the target entity, and wherein execution of the instructions further cause the at least one processor to output the alert by at least causing the at least one processor to output the alert to indicate a difference between the performance metric for the target entity and the performance metric for the cluster that includes the target entity.

28. The computing device of claim 18, wherein the activity data is indicative of one or more performance metrics for the workers, and wherein execution of the instructions further cause the at least one processor to determine whether a performance metric of the target entity satisfies a threshold for the performance metric, wherein execution of the instructions further cause the at least one processor to, in response to determining that the performance metric does not satisfy the threshold for the performance metric: determine, based on at least on an activity model trained using historical activity data for workers, one or more activities likely to improve the performance metric of the target entity; and output an indication of the one or more activities.

29. The computing device of claim 18, wherein the safety events correspond to a type of activity performed by a respective worker, wherein the performance by the target entity with respect to safety events corresponds to a frequency with which the one or more workers associated with the target entity perform of the type of activity, and wherein performance by the cluster that includes the target entity with respect to safety events corresponds to a frequency with which one or more workers associated with the one or more entities of the cluster that includes the target entity perform of the type of activity.

30. The computing device of claim 18, wherein at least one of the PPE devices is a communication hub that includes the computing device.

\* \* \* \* \*

UNITED STATES PATENT AND TRADEMARK OFFICE
CERTIFICATE OF CORRECTION

PATENT NO. : 10,997,543 B2
APPLICATION NO. : 16/400738
DATED : May 4, 2021
INVENTOR(S) : Nick Asendorf et al.

It is certified that error appears in the above-identified patent and that said Letters Patent is hereby corrected as shown below:

On the Title Page

Page 2, Column 2, Item (56) (Other Publication), Line 1, Delete "Swimmno," and insert
-- Swimmo, --, therefor.

In the Specification

Column 3, Line 65, Delete "and or" and insert -- and/or --, therefor.

Column 10, Line 8, Delete "provides" and insert -- provide --, therefor.

Column 18, Line 51, Delete "(LUQ)," and insert -- (LVQ), --, therefor.

In the Claims

Column 35, Line 3, In Claim 26, Delete "alert-by" and insert -- alert by --, therefor.

Signed and Sealed this
Seventh Day of December, 2021

Drew Hirshfeld
*Performing the Functions and Duties of the
Under Secretary of Commerce for Intellectual Property and
Director of the United States Patent and Trademark Office*